US 6,673,953 B2

(12) United States Patent
Keller et al.

(10) Patent No.: US 6,673,953 B2
(45) Date of Patent: Jan. 6, 2004

(54) POLYMERIC AND CARBON COMPOSITIONS WITH METAL NANOPARTICLES

(75) Inventors: Teddy M. Keller, Fairfax Station, VA (US); Joseph Perrin, Centerville, VA (US); Syed B. Qadri, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 8 days.

(21) Appl. No.: 10/006,226

(22) Filed: Dec. 10, 2001

(65) Prior Publication Data

US 2003/0114698 A1 Jun. 19, 2003

(51) Int. Cl.[7] .......................... C07F 17/02; C07F 11/00; C08J 9/00; H01B 1/04
(52) U.S. Cl. .......................... 556/143; 556/28; 556/43; 556/46; 556/58; 556/136; 521/93; 252/502; 252/503
(58) Field of Search .............................. 556/28, 46, 43, 556/58, 136, 143; 252/502, 503; 521/93

(56) References Cited

U.S. PATENT DOCUMENTS

| 3,713,865 | A | 1/1973 | Leeds ..................... 117/46 CC |
| 5,876,687 | A | 3/1999 | Hung ........................ 423/592 |
| 5,948,475 | A | 9/1999 | Hung ........................ 427/294 |
| 6,039,930 | A | 3/2000 | Hung ........................ 423/592 |
| 6,103,210 | A | 8/2000 | Hung ........................ 423/439 |

FOREIGN PATENT DOCUMENTS

JP  60153943 A2  8/1985

OTHER PUBLICATIONS

Lebreton et al., Inorganica Chimica Acta, vol. 272, pp. 188–196 (1998).*

(List continued on next page.)

*Primary Examiner*—Porfirio Nazario-Gonzalez
(74) *Attorney, Agent, or Firm*—John J. Karasek; Joseph T. Grunkemeyer

(57) ABSTRACT

The invention comprises a chemical composition with the structure shown below. The composition can be polymerized or pyrolyzed, forming transition metal nanoparticles homogeneously dispersed in a thermoset or carbon composition. The size of the nanoparticles can be controlled by manipulating the number and arrangement of functional groups in the composition and by changing the conditions of the polymerization or pyrolysis. The resulting thermosets and carbon compositions have useful magnetic, electric, mechanical, catalytic and/or optical properties.

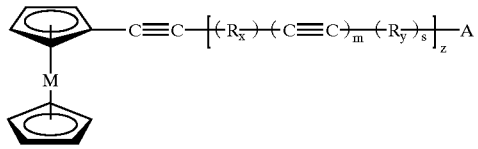

wherein A is selected from the group consisting of H,

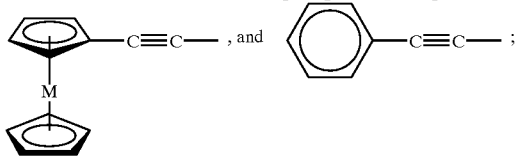

wherein M is a metal selected independently from the group consisting of Fe, Mn, Ru, Co, Ni, Cr and V;
  wherein Rx is independently selected from the group consisting of an aromatic, a substituted aromatic group and combinations thereof;
  wherein Ry is independently selected from the group consisting of an aromatic, a substituted aromatic group and combinations thereof;
  wherein m is $\geq 0$;
  wherein s is $\geq 0$;
  wherein z is $\geq 0$; and
  wherein m and s are independently determined in each repeating unit.

14 Claims, 12 Drawing Sheets

OTHER PUBLICATIONS

Stepnicka et al., Journal of Organometallic Chemistry, vol. 637–639, pp. 291–299 (Dec. 3, 2001).*

Yu et al., J. Org. Chem., vol. 64, pp. 2070–2079 (1999).*

Jacoby, Data Storage: New Materials Push the Limits, Jun. 12, 2000, C&EN, pp. 37–45.

Koltypin et al, Encapsulationof Nickel Nanoparticles in Carbon Obtained by the Sonochemical Decomposition of Ni(C8H12)2, Chem. Mater., 1999, vol. 11, pp. 1331–1335.

Morales et al, Surface and Internal Spin Canting in y–Fe2O3 Nanoparticles, Chem. Mater., 1999, vol. 11, pp. 3058–3064.

Jia et al, Some Acetylene and Hydride Chemistry of Group 8 Metal Complexes with Cyclopentadienyls and their Analogous Ligands, J. Organometallic Chemistry, 565, (1998), pp. 37–48.

Kruis et al, Synthesis of Nanoparticles in the Gas Phase for Electronic, Optical and Magnetic Applications– A Review, J. Aerosol Sci. vol 29, No. 5/6, pp. 511–535, 1998.

Carpenter et al, Organometallic Compounds as Single–source Precursors to Nanocomposite Materials: An Overview, J. Organometallic Chemistry 557 (1998), pp. 121–130.

Manziek et al, Functional Emulsion and Suspension Polymer particles: Nanoreactors for the Synthesis of Inorganic Materials, Chem. Mater., 1998, vol. 10, pp. 3101–3108.

Fink et al, Ethynylferrocene Compounds of 1,3,5–Tribromobenzene, Organometallics, 1997, vol. 16, pp. 2646–2650.

Moumen et al, New Synthesis of Cobalt Ferrite Particles in the Range 2–5nm: Comparison of the Magnetic Properties of the Nanosized Particles in Dispersed Fluid or in Powder Form, Chem. Mater., 1996, vol. 8, pp. 1128–1134.

Hsung et al, Synthesis and characterization of Unsymmetric Ferrocene–Terminated Phenyletheynyl Oligomers Cp2Fe–(C=C–C6H4)n–X(X=SH, SMe, SOMe, and SO2Me), Organometallics, 1995, vol 14, pp. 4808–4815.

Moller et al, Inorganic Nanoclusters in Organic Glasses– Novel Materials for Electro–optical Applications, Synthetic Metals, 41–43 (1991) pp. 1159–1162.

Hess et al, Polymers for Stabilization of Colloidal Cobalt Particles, J. Applied Polymers Science, vol 10, (1966), pp. 1915–1927.

Thomas, Preparation and Magnetic Properties of Colloidal Cobalt particles, J. Appl. Phys., (1996).

Keller et al, Polymeric and Carbon Compositions with Metal Nanoparticles, Application No. 10/006, 386, filed Dec. 10, 2001.

Sedlacek et al., Polymerization of 4–(ferrocenylethynyl) phenylacetylene with transition metal catalysts, Macromolecular Chemistry and Physics, May 1999, vol. 200, No. 5, pp. 972–976.

Nock et al., Organometalic NLO–Materials Based on ACETYL–and Ethynyltolanes as Rigid Rod Intermediates, Mol. Cryst. Liq. Cryst., 1993, vol. 235, pp. 237–244.

* cited by examiner

| SAMPLE | e-LATTICE PARAMETER | Gr. (PARTICLE SIZE) | Fe (PARTICLE SIZE) |
|---|---|---|---|
| 2a | 10.234 Å | 67.5Å | 161Å |
| 2b | 10.249Å | 60.5Å | 175Å |
| 4a | 10.283Å | 61.0Å | 204Å |
| 4b | 10.208Å | 60.0Å | 151Å |

*FIG. 12*

POLYMERIC AND CARBON COMPOSITIONS WITH METAL NANOPARTICLES

BACKGROUND OF THE INVENTION

1. Field of the Invention

The present invention relates generally to organic compositions containing a metal, and more specifically, to polymer compositions containing metallocene(s) and/or metal nanoparticles and carbon compositions containing metal nanoparticles homogeneously dispersed therethrough, and methods for manufacturing.

2. Description of the Background Art

Because of processing advantages, polymers containing transition metals can be of considerable interest as potential pyrolytic precursors to metallic nanoparticle carbon and ceramic compositions. The design and synthesis of macromolecules that incorporate transition metals or transition metal complexes as essential structural elements constitutes an area of growing research interest promoted largely by the prospect that such materials may possess novel catalytic, optical, redox, magnetic, or electrical properties. The use of such materials as precursors to transition metal-containing carbon and ceramic compositions is virtually unexplored.

Most approaches to such materials have involved chemical modification of preformed preceramic polymers such as the derivatization of liquid poly(methylsilanes) by dehydrogenative coupling using $MMe_2(C_5H_5)_2$(M=Ti, Zr, or Hf) which yields SiC/MC composites after pyrolysis. Studies of the thermal stability by thermogravimetric analysis (TGA) have shown that these polymers undergo significant weight loss (35–56%) between 350–500° C. but show no further weight loss up to 1000° C. The lustrous ceramic products formed when ferrocene-containing polymers are heated to about 500° C. under a slow flow of nitrogen are ferromagnetic and have been characterized as amorphous iron silicon carbide materials by X-ray photoelectron spectroscopy (XPS) and energy dispersive X-ray (EDA) microanalysis. Other approaches have involved the pyrolysis of poly(silylacetylenes) or other silicon-containing polymers in the presence of transition-metal powders or oxides to yield MC/MSi/SiC or SiC/MN composites.

Carbon-carbon (C—C) composites are emerging materials with potential applications as high temperature structural materials for the space and aerospace industries. This is because they possess not only light-weight but high thermal conductivity and high dimensional stability up to 3000° C. in a protective environment. Carbon-carbon composites are prepared by using carbon fibers as reinforcement and thermosetting or thermoplastic resins as matrix precursors. On pyrolysis, the thermosetting resin yields a non-graphitic matrix whereas the thermoplastic resin leads to graphitic carbon. Matrix microstructure plays an important role in deciding the overall performance and particularly the mechanical properties of C—C composites. Numerous studies have been carried out to understand and control the microstructure and the degree of graphitization in the developing matrix under various carbonization conditions. In addition to carbon precursor material, the heat treatment temperature, which is typically between 2000 and 3000° C., also influences the degree of graphitization. Several methods have been investigated to improve the degree of graphitization under milder conditions. One such method is catalytic graphitization, which is brought about by addition of certain inorganic and organic additives to the matrix precursors before conversion to the carbonaceous matrix. The overall effect is to lower the temperature needed to achieve a certain degree of graphitization. Very little research has been reported using melt processable polymeric and carbon precursor materials containing organometallic groups. During the heat treatment, the organometallic units are destroyed and the metal particles are molecularly dispersed homogeneously throughout the matrix.

Dispersion of very small metal particles in polymeric, carbon, or ceramic matrices are scientifically and technologically important for a variety of reasons. The preparation of nanoscale materials with unique properties represents a significant challenge. Materials with particles in the range of 1–10 nanometers would be expected to exhibit unique properties due to their extremely small dimensions. One potential advantage of a dispersed particle system is that many of its properties are strongly dependent on the interfacial properties of the materials because the fraction of the overall materials, which is in the vicinity of the fraction of an interface, is quite high. In addition to simply providing a large interfacial area, dispersions of very small inorganic particles may have useful electronic, optical, magnetic, chemical, catalytic and unique mechanical properties. Many of these properties such as superparamagnetism in magnetic materials or tunable band gaps in quantum dot semiconductor arrays require that particle sizes and interparticle spacings should be in the nanometer range. Because of the similarity of these dimensions to the typical sizes of polymeric molecules, there is considerable interest in using polymeric materials to control the sizes and distributions of nanoparticle dispersions. One approach that has been employed by several groups is to use ordered block copolymers as templates for controlling the distributions of the metal particles. Unfortunately, the morphology of the underlying polymeric template and the morphology of the resultant particle dispersion were not related to each other in a completely straightforward way to afford uniform particle dispersion. This result can be partially explained in terms of kinetic limitations on particle coalescence in the presence of the polymer molecules in the solid state.

Moreover, well-ordered arrays of metal particles with controlled sizes have been obtained in solvent-cast films. For practical reasons, it would be convenient to process and control metal dispersions from decomposition of organometallic containing polymers or compounds in the melt state. For example, the viscosity of the composition would be expected to control the diffusive properties of the individual metal particles and particle coalescence.

Molecular or macromolecular materials, which contain atoms or transition metal elements in close proximity, are attracting increasing attention because of their potentially interesting electrical, redox, optical, and magnetic characteristics. Small particles with diameters less than 10 nanometers exhibit material properties that strongly differ from those of bulk phases. Their electronic, magnetic, and optical properties contribute attractive prospects in the design of new electronic and optical devices, information storage, color imaging, bioprocessing, magnetic refrigeration, ferrofluids, gas sensors, etc. In these applications, small particles of metal oxides have been shown to be particularly important.

The general properties of metal nanoparticles or metal clusters of one to a few nanometers can be of immense importance on the basis of numerous investigations in the last few years. The physical properties of metal nanoparticles are attracting increasing interest because they may differ significantly from the bulk properties as a result of surface or quantum size effects. Quantum size effects open the door to novel future technologies. The success of such future applications of metal nanoparticles will strongly depend on the availability of one, two, or three dimensionally organized materials. To study quantum size behavior of small metal particles, the particles must be separated from each other to avoid coalescence and to keep the individual nature of the particles. Small crystallites behave like large molecules (e.g., polycyclic aromatic hydrocarbons) in their spectroscopic properties. They do not exhibit bulk semiconductor electronic properties. Metal nanoparticles or nanoclusters can be considered the building blocks of future modern technologies. This will be due to the size dependent electronic properties of these particles. Nanoparticles of transition metals become semiconductors if small enough. As the more technological problems such as organization and addressing of quantum dots are better understood, there is an almost unlimited field of applications to be foreseen. The properties of nanosized semiconductors have long been known to depend very sensitively on the particle size.

OBJECTS OF THE INVENTION

Accordingly, one object of the present invention is to provide a novel method of preparing a carbonaceous composition with metal nanoparticles dispersed homogeneously.

Another object of the present invention is to provide a novel composition of a carbonaceous composition with metal nanoparticles dispersed homogeneously in a matrix.

A further object of the present invention is to provide a novel method of preparing a thermoset composition with metal nanoparticle in a matrix.

Yet a further object of the invention is to provide novel organic compositions of a thermoset composition with metal nanoparticles in a matrix.

A still further object of the present invention is to provide a novel method of preparing a thermoset composition with metallocene groups in a matrix.

A further object of the present invention is to provide a novel composition of a thermoset composition with metallocene groups in a matrix.

Another object of the invention is to provide novel organic compositions with metal nanoparticles dispersed homogeneously in a matrix in which the composition has mechanical, magnetic, electrical, catalytic and optical properties.

A still further object of the invention is to provide novel organic compositions with metal nanoparticles dispersed homogeneously in a matrix in which the metal nanoparticle is a transition metal.

SUMMARY OF THE INVENTION

These and other objects of this invention are achieved in a preferred embodiment of the invention comprising the formula:

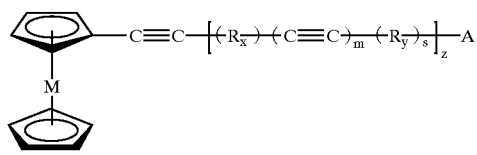

wherein A is selected from the group consisting of H,

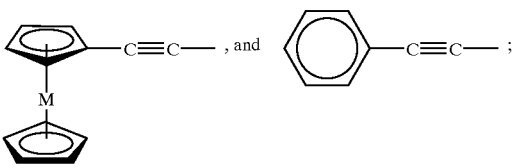

wherein M is a metal selected independently from the group consisting of Fe, Mn, Ru, Co, Ni, Cr and V;

Rx is independently selected from the group consisting of an aromatic, a substituted aromatic group and combinations thereof;

Ry is independently selected from the group consisting of an aromatic, a substituted aromatic group and combinations thereof;

m is $\geq 0$;

s is $\geq 0$;

z is $\geq 0$; and m and s are independently determined in each repeating unit.

In another embodiment, the invention comprises a method of forming a monomer formed by the following steps: forming a 1-(metallocenylethynyl)-3 or 4-halobenzene; reacting 1-(metallocenylethynyl)-3 or 4-halobenzene with a phenylacetylene; and forming a 1-(metallocenylethynyl)-3- or 4-(phenylethynyl)benzene.

In yet another embodiment, the invention comprises a method of forming a monomer formed by the following steps: forming a 1-(metallocenylethynyl)-3 or 4-halobenzene; reacting 1-(metallocenylethynyl)-3 or 4-halobenzene with an ethynylmetallocene; and forming a 1,3 or 1,4-bis(metallocenylethynyl)benzene.

In still another embodiment, the invention comprises a carbon composition containing transition metal nanoparticles homogeneously dispersed throughout a matrix of said carbon composition in which the carbon composition is formed from the heat treatment at from about 500° C. and above of the formula shown above.

In still another embodiment, the invention comprises a thermoset containing transition metal nanoparticles homogeneously dispersed throughout a matrix in which said thermoset is formed from the heat treatment at from about the melting point of about 500° C. and above the melting point of the monomer of the formula shown above.

In yet another embodiment, the invention comprises a method of forming a polymeric monomer comprising the steps of:

forming a 1-(metallocenylethynyl)-3 or 4-halobenzene;

reacting said 1-(metallocenylethynyl)-3 or 4-halobenzene with (trimethylsilanyl)acetylene to form 1-(metallocenylethynyl)-3 or 4-ethynylbenzene;

reacting 1-(metallocenylethynyl)-3 or 4-ethynylbenzene with a di-substituted aromatic halide to form 1-(metallocenylethynyl)-3 or 4-(phenylethynyl)3- or 4-phenyl halide;

reacting said 1-(metallocenylethynyl)-3 or 4-(phenylethynyl)3- or 4-phenyl halide with (trimethylsilanyl)acetylene to form metallocenyl-poly (3- or 4-ethynylphenyl)-acetylene;

repeating the prior two steps, zero or more times, by reacting with di-substituted aromatic halide followed by (trimethylsilanyl)acetylene to increase the length of said monomer;

forming a metallocenyl-poly(3- or 4-ethynylphenyl) monomer comprising the following formula by reacting the metallocenyl-poly(3 or 4-ethynylphenyl)-acetylene with 1-halo-3 or 4-substituted benzene:

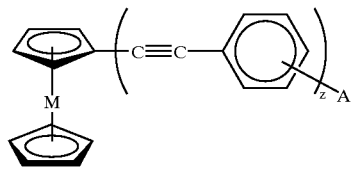

wherein A is selected from the group consisting of H,

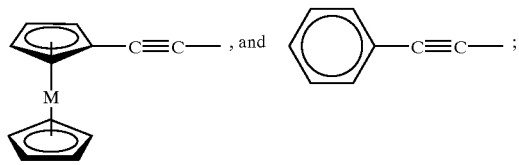

wherein M is a metal selected independently from the group consisting of Fe, Mn, Ru, Co, Ni, Cr and V; and wherein z is ≧1.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein:

FIG. 12 is a Table of X-Ray Diffraction Data on 1,3-bis (ferrocenylethynyl)benzene, 1,4-bis(ferrocenylethynyl) benzene, 1-(ferrocenylethynyl)-3-(phenylethynyl)benzene and 1-(ferrocenylethynyl)-4-(phenylethynyl)benzene heated to 1000° C.

DETAILED DESCRIPTION OF THE PREFERRED EMBODIMENT

Figure 1:
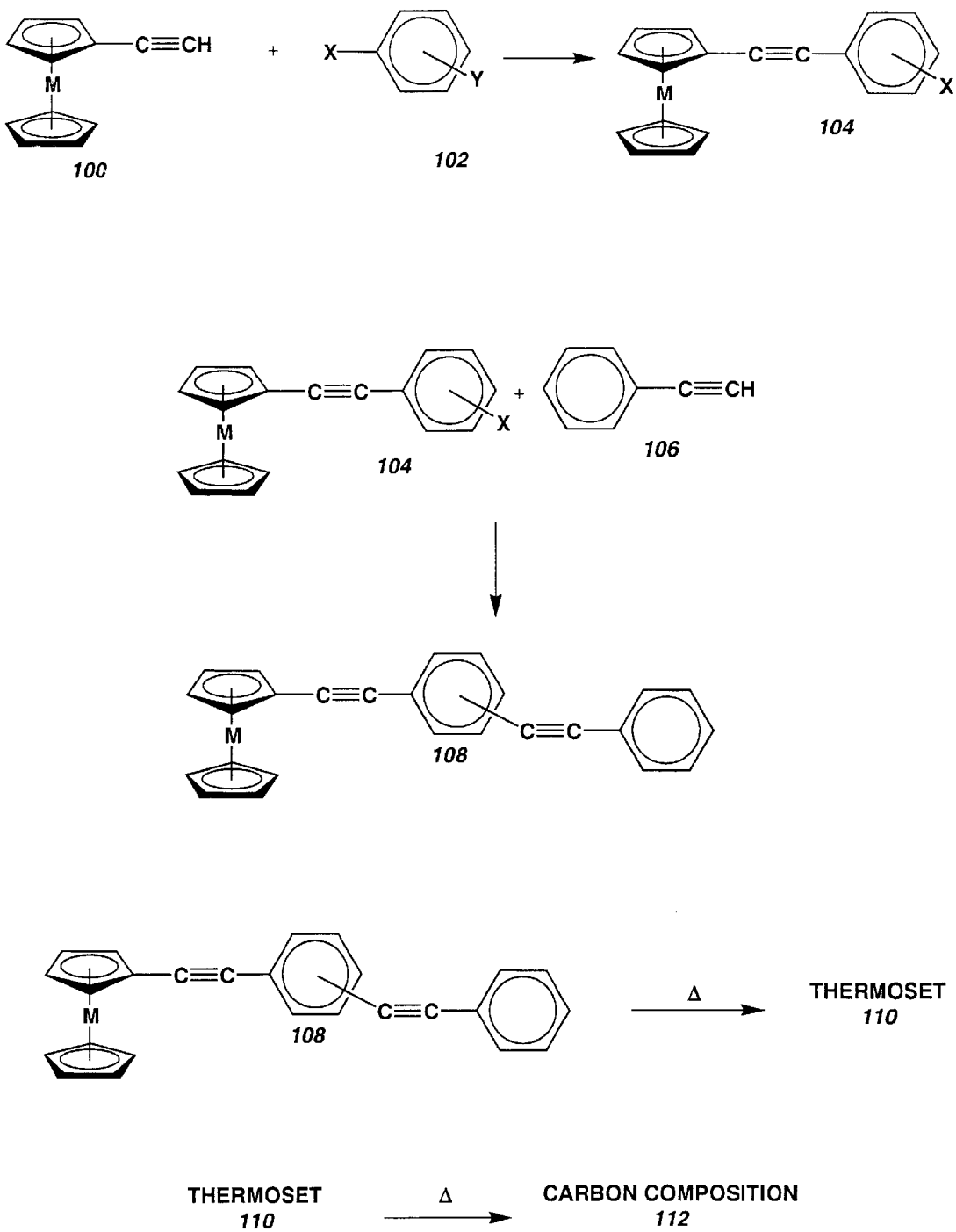
FIG. 1 is an illustration of a sequence of the generalized reaction steps involved in the present invention.

Referring now to the drawings, the method of manufacture of the thermoset and carbon compositions containing metallocene and/or metal nanoparticles suitable for use involves the following steps:

As shown in FIG. 1, an ethynylmetallocene, metallocenylacetylene 100, is reacted with a di-substituted aromatic halide 102. The method is described in General Procedure for the Palladium-Catalyzed Cross-Coupling Reactions. The metal in the metallocene 100 can be a transition metal. Preferably, the transition metal is Fe, e.g., 200 and 300. The transition metal is selected independently from the group consisting of Fe, Ru, Mn, Ni, V, Cr, Co and combinations thereof. Transition metals of interest are metals possessing electrical and magnetic properties. Attached to the metallocene is a terminal ethyne group thereby forming the reactant ethynylmetallocene 100. The acetylenic or ethynyl group is of particular interest as it can be polymerized and cross-linked to form a thermoset 110 and/or it can be pyrolyzed to form a carbon composition 112. The ethynyl unit is for polymerization purposes and for further reaction.

An aromatic halide 102 substituted at either the 1,3- or the 1,4-positions is selected to react with the acetylenic or ethynyl group. Br and I or a combination thereof are the desired substituents on the aromatic group. I is more reactive with the acetylenic group than Br and therefore it is the halogen most likely to initially react thereby leaving the Br attached to the aromatic group if both I and Br were the di-substituents on the aromatic ring(s). The halogens can be substituted on any aromatic ring, e.g., benzene, naphthalene, biphenyl, anthracene, other aromatic groups, substituted aromatic groups and combinations thereof. In Example 1,1-bromo-3-iodobenzene 202, FIG. 2, was used as the di-substituted aromatic halogen and in Example 2, a 1-bromo-4-iodobenzene 302, FIG. 3, was used.

The reaction of the ethynylmetallocene 100 with the di-substituted aromatic halide 102 forms a 1-(metallocenylethynyl)-3 or 4-halobenzene 104. 1-(Ferrocenylethynyl)-3-bromobenzene 204 was synthesized in Example I and 1-(ferrocenylethynyl)-4-bromobenzene 304 was synthesized in Example 2.

Figure 2:
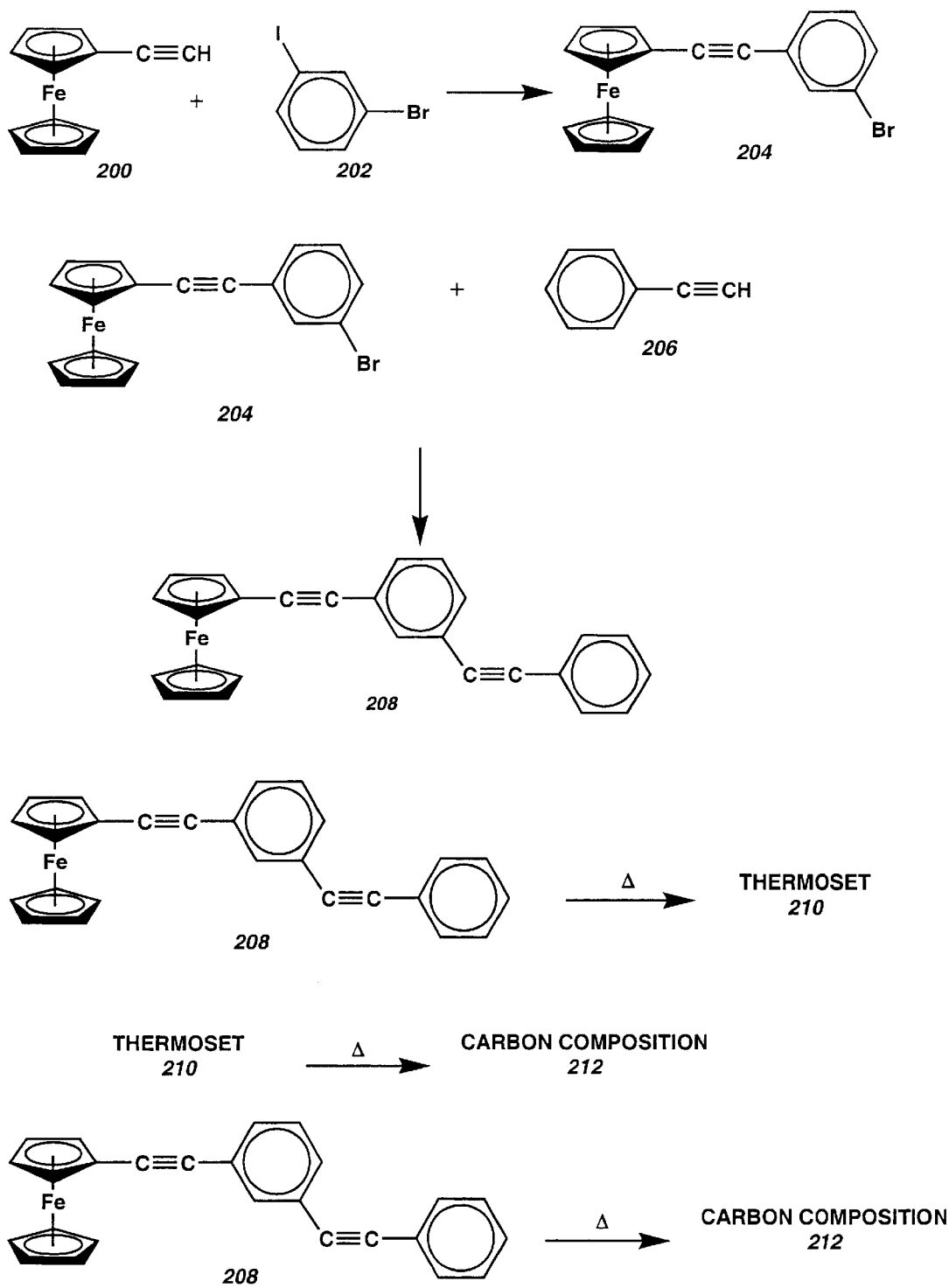
FIG. 2 is an illustration of a sequence of reaction steps involving a specific initial reactant as described in Examples 1, 3, 5, 7 and 9.
Figure 3:
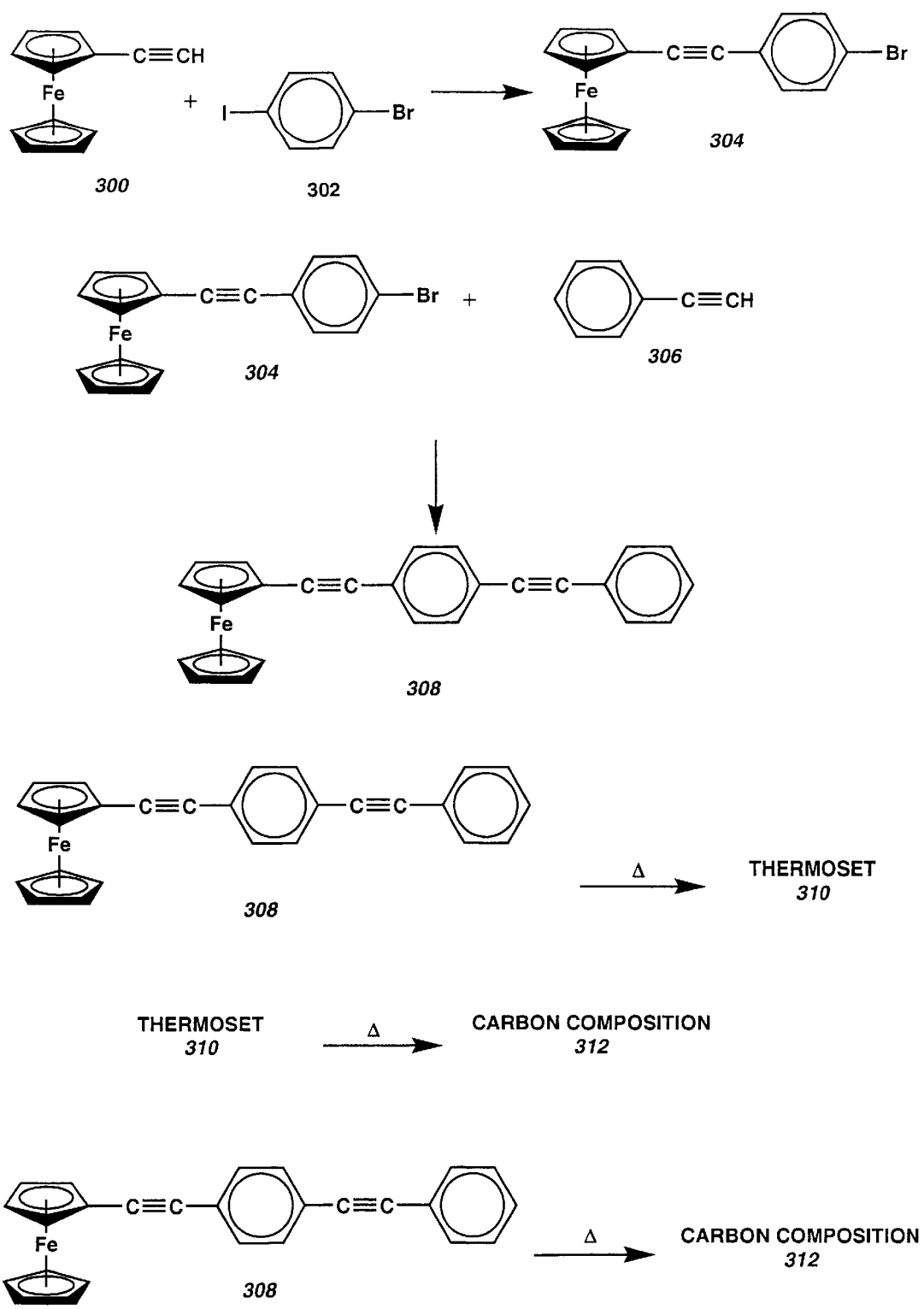
FIG. 3 is an illustration of a sequence of reaction steps involving another specific reactant as described in Examples 2, 4, 6, 8 and 10.

The precursor 1-(metallocenylethyne)-3 or 4-halobenzene 104 is then reacted with phenylacetylene 106 to form a 1-metallocenylethynyl-3 or 4-(phenylethynyl)benzene 108. The phenylacetylene 106, can be a substituted phenylacetylene, a substituted aromatic group having an attached acetylene group or combinations thereof. Specifically in FIG. 3 it is illustrated that the reaction of 1-(ferrocenylethynyl)-4-bromobenzene 304 and phenylacetylene 306 form 1-(ferrocenylethynyl)-4-(phenylethynyl)benzene 308. The reaction procedure is described in Example 4. FIG. 2 illustrates the reaction of 1-(ferrocenylethynyl)-3-bromobenzene 204 and phenylacetylene 206 to form 1-(ferrocenylethynyl)-3-(phenylethynyl)benzene 208. The reaction procedure is described in Example 3.

Figure 7:
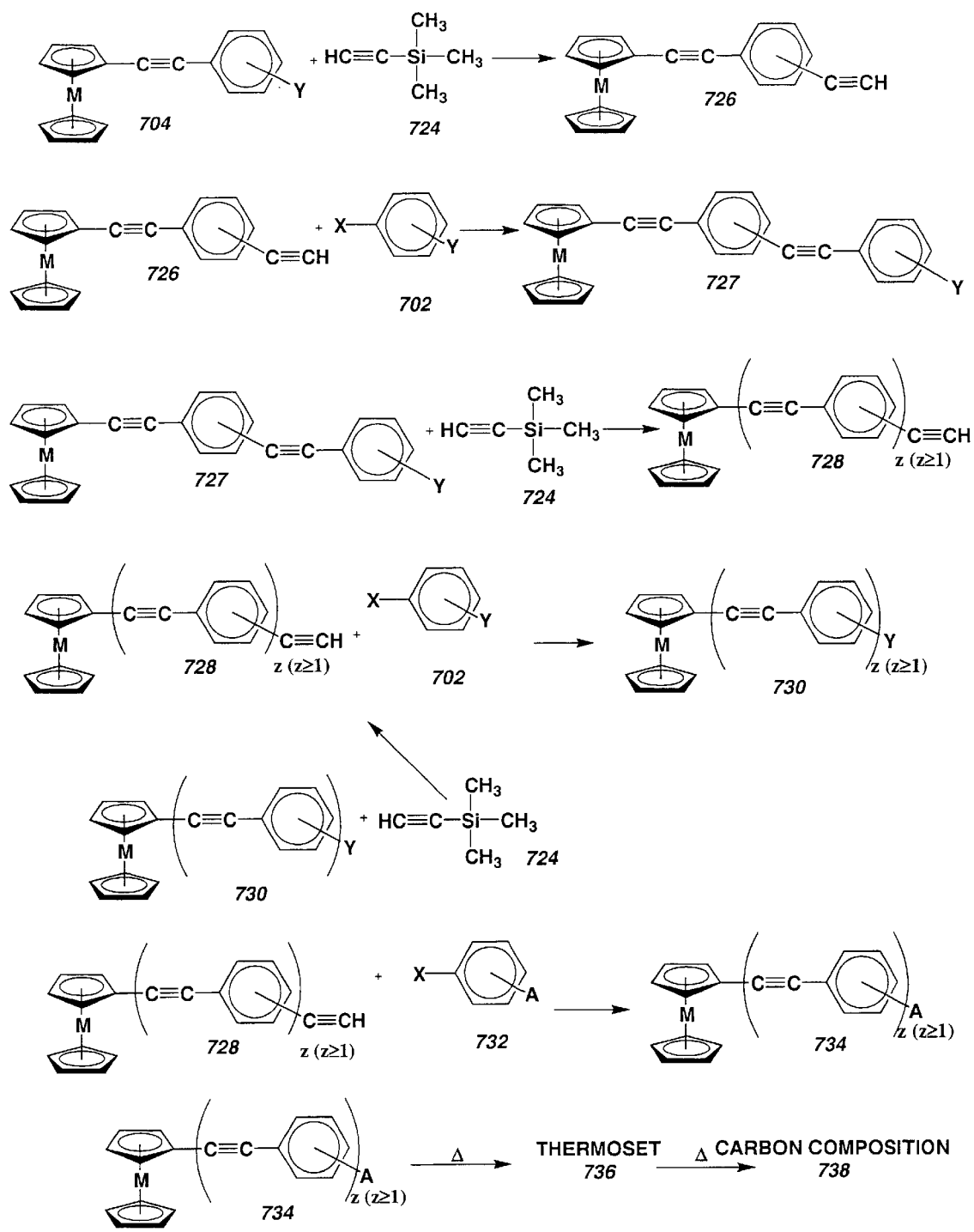
FIG. 7 is an illustration of a general sequence of reaction steps.

One can extend the chain length by reacting the 1-(metallocenylethynyl)-3 or 4-halobenzene 704 with (trimethylsilanyl)acetylene 724 in order to attach another acetylenic group to the chain to form 1-(metallocenylethynyl)-3 or 4-ethynylbenzene 726. This reaction is followed by a reaction with a di-substituted aromatic halide 702 to form 1-(metallocenylethynyl)-3- or 4-(phenylethynyl)-3 or 4-phenylhalide 727. This procedure can be repeated to extend the ethynyl aromatic linkage to form metallocenyl-poly(3-or 4-ethynylphenyl)-acetylene 728 by reacting 728 with 702 followed by 724. Metallocenyl-poly(3-or 4-ethynylphenyl)-acetylene 728 can react with di-substituted aromatic halide 702 to form metallocenyl-poly(1,3- or 1,4-ethynylphenyl)halide 730 which can then be reacted with 724 to increase the chain in 728. This composition 728 is reacted with 1-halo-3- or 4-substituted benzene 732 to form 1-(metallocenyl)-poly (1,3 or 1,4-ethynylphenyl) monomer 734 which can be polymerized to a thermoset 736 and pyrolyzed to a carbon composition 738. This structure is terminated with A as defined above and "z" is the number of repeating units which is 1 or more. This is illustrated in FIG. 7.

Following the General procedure for thermoset formation, the 1-(metallocenylethyne)-3 or 4-(phenylethynyl)benzene 108 is polymerized to a thermoset 110. Somewhere between 250° C. and 500° C. depending on the temperature and reaction time, the thermoset begin to form. At about 300° C., nanoparticles begin to appear. The formation of nanoparticles is determined by X-ray. The higher the temperature the quicker the formation of the nanoparticles. The size of the nanoparticles is between about 1 nm and about 20 nm. As the temperature is increased, the carbon composition forms. The size of the nanoparticles also increases, 1–100 nm, for thermoset and carbon compositions as the nanoparticle agglomerate. The formation of the carbon composition 112 commences at about 500° C. to about 600° C. A temperature range of 500–3000° C., preferably between 500–2500° C. and more preferably between 1000–2000° C. allows for the formation of the carbon composition. The nano-particles are dispersed homogeneously throughout the carbon matrix.

Examples 5 and 6 describe the polymerization of 1-(ferrocenylethynyl)-3-(phenylethynyl) benzene 208 and 1-(ferrocenylethynyl)-4-(phenylethynyl) benzene 308, respectively, to thermosets 210 and 310. The thermoset will begin to solidify above the melting point. At this temperature the thermoset can be shaped, see Example 19. Metal nanoparticles begin to form between 300–500° C. in the cross-linked polymer domain as the metallocene begins to decompose. By nanoparticles it is meant that the metal is released from the metallocene structure and disperses uniformly throughout the polymer matrix. The viscosity in the melt at a given temperature will control the diffusive properties of the individual metal particles in the polymerizing matrix. The size and interparticle separation of the Fe nanoparticles will be controlled above 300° C. Upon gelation, the mobility of the Fe particles will cease and the particles will be locked in place. The matrix domain seems to have the ability to control the size and shape of the growing metal nanoparticles and to protect it against oxidation. The thermoset 110 can then be pyrolyzed to carbon composition 112 in which the metal nanoparticles are homogeneously distributed throughout the matrix. Examples 7 and 8 describe the carbonization of the thermosets 210 and 310 to carbon compositions 212 and 312. Alternately, Examples 9 and 10 describe the direct carbonization of 1-(ferrocenylethynyl)-3-(phenylethynyl) benzene 208 and 1-(ferrocenylethynyl)-4-(phenylethynyl)benzene 308 to the carbon compositions 212 and 312. When the temperature is raised above 500° C., the composition carbonizes and the nanoparticles are homogeneously dispersed throughout the matrix.

Figure 4:
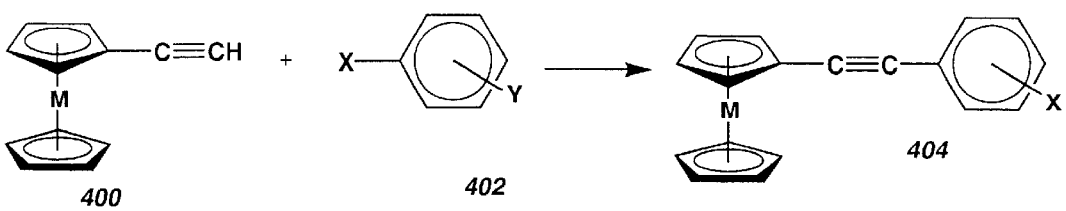
FIG. 4 is an illustration of a sequence of reaction steps involving another generalized set of reaction steps involved in the present invention.
Figure 4:
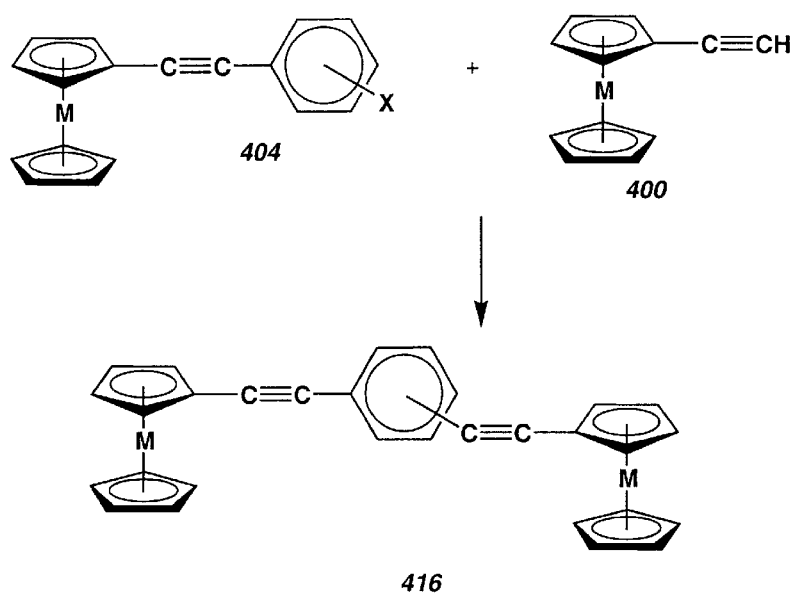
Figure 4:
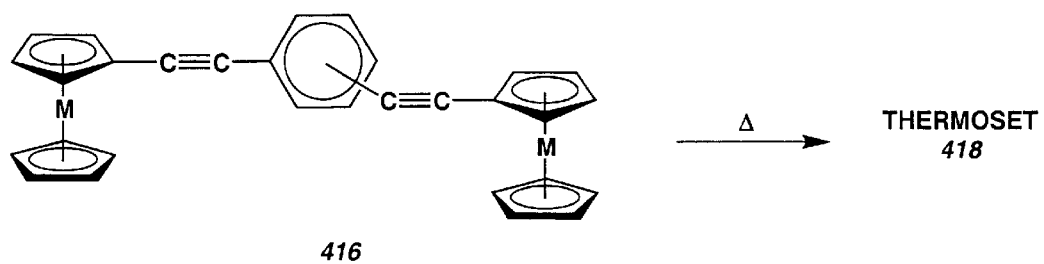
Figure 4:

FIG. 4 shows the general scheme for synthesizing a bis(metallocenylethynyl) benzene 416. The method is described in General Procedure for the Palladium-Catalyzed Cross-Coupling Reactions. The metal in the metallocene 400 can be a transition metal. Preferably, the transition metal is Fe, e.g., 500 and 600. The transition metal is selected independently from the group consisting of Fe, Ru, Mn, Ni, V, Cr, Co and combinations thereof. Transition metals of interest are metals possessing electrical and magnetic properties. Attached to the metallocene is a terminal acetylene group thereby forming the reactant ethynylferrocene or ferrocenylacetylene 400. The acetylenic group is of particular interest as it can be polymerized and cross-linked from 416 to form a thermoset 418, which can be pyrolyzed to form a carbon composition 420. The ethynyl unit is for polymerization purposes.

Figure 5:
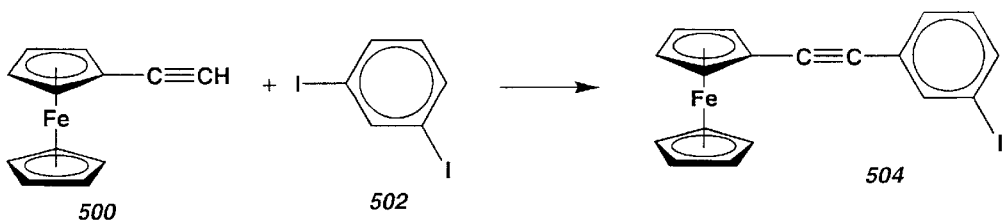
FIG. 5 is an illustration of a sequence of reaction steps involving a specific initial reactant as described in Examples 11, 13 and 15.
Figure 5:
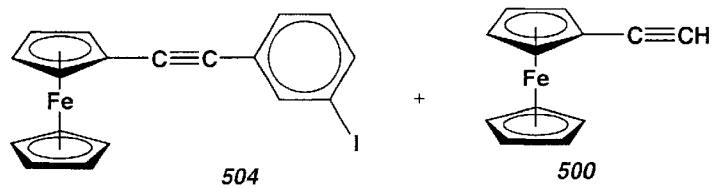
Figure 5:
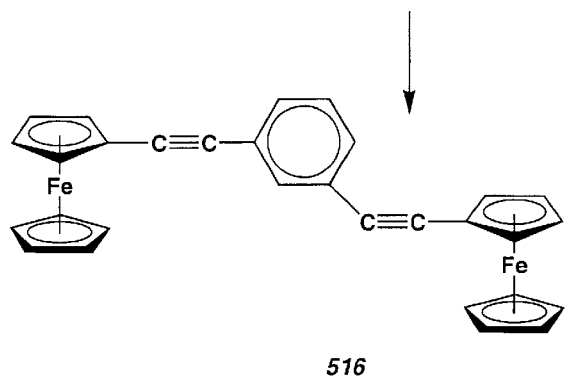
Figure 5:
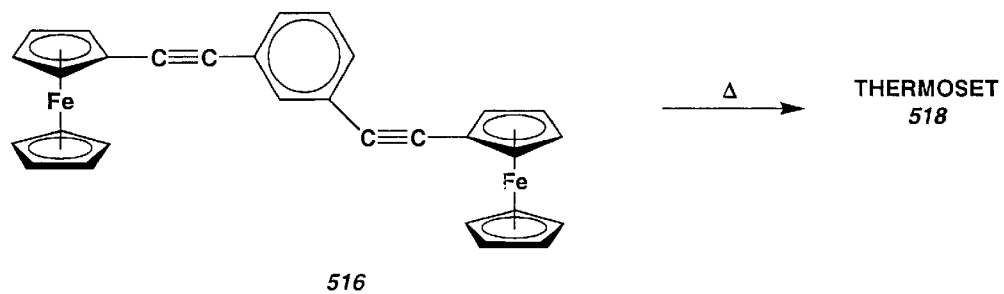
Figure 5:
Figure 6:
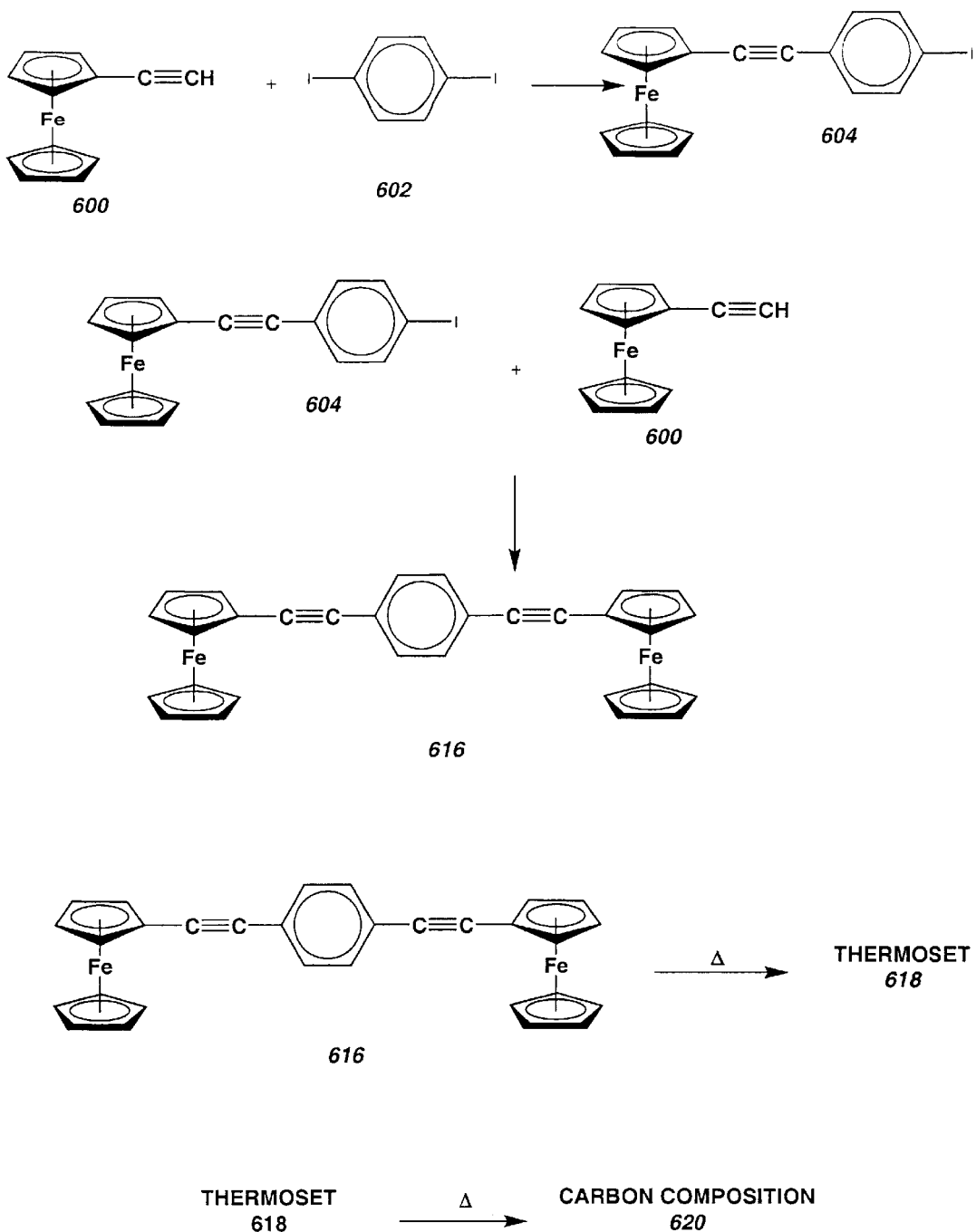
FIG. 6 is an illustration of a sequence of reaction steps involving a specific initial reactant as described in Examples 12, 14 and 16.

An ethynylmetallocene 400 is reacted with a di-substituted aromatic halide 402 to form a 1-(metallocenylethynyl)-3 or 4-halobenzene 404. An aromatic halide 402 substituted at either the 1,3- or the 1,4-positions is selected to react with the acetylenic group. Br or I or a combination thereof are the desired substituents on the aromatic group. I is more reactive with the acetylenic group than Br and therefore it is the halogen most likely to initially react thereby leaving the Br attached to the aromatic group if both I and Br were the di-substituents on the aromatic ring. The halogens can be substituted on any aromatic ring, e.g., benzene, naphthalene, biphenyl, anthracene, other aromatic groups, substituted aromatic groups and combinations thereof. Both 1,3-diiodobenzene 502 and 1,4-diiodobenzene 602 were used as the di-substituted aromatic halogen is illustrated in FIGS. 5 and 6.

The 1-(metallocenylethynyl)-3 or 4-halobenzene 404 is then reacted with another ethynylmetallocene 400 to form a 1,3 or 1,4-bis(metallocenylethynyl) benzene 416. The two metallocenes 400 can be the same compound or different compounds, e.g., the metallocenes can each contain a different metal. When they are the same compound, both reaction steps can be performed as one step, as in Examples 11 and 12. The bis(metallocenylethynyl) benzene 416 can then be polymerized to a thermoset 418, followed by pyrolysis to a carbon composition 420.

Example 11 describes the procedure for producing 1,3-bis(ferrocenylethynyl) benzene 516.

Ethynylferrocene 500 was reacted with 1,3-diiodobenzene 502 to form 1-(ferrocenylethynyl)-3-iodobenzene 504. Sufficient ethynylferrocene 500 was present such that the second step of the reaction immediately proceeded. 1-(Ferrocenylethynyl)-3-iodobenzene 504 reacted with ethynylferrocene 514 to form 1,3-bis (ferrocenylethynyl) benzene 516. The reaction procedure is shown in FIG. 5.

Example 12 describes the procedure for producing 1,4-bis(ferrocenylethynyl) benzene 616. Ethynylferrocene 600 was reacted with 1,4-diiodobenzene 602 to form 1-(ferrocenylethynyl)-4-iodobenzene 604. Sufficient ethynylferrocene 600 was present such that the second step of the reaction immediately proceeded. 1-(Ferrocenylethynyl)-4-iodobenzene 604 reacted with ethynylferrocene 600 to form 1,4-bis(ferrocenylethynyl) benzene 616. The reaction procedure is shown in FIG. 6.

Examples 13 and 14 describe the polymerization of 1,3-bis(ferrocenylethynyl) benzene 516 and 1,4-bis (ferrocenylethynyl) benzene 616, respectively, to thermosets 518 and 618. The procedure was the same as the general procedure for thermoset formation. Nanoparticles are formed in the same way as in the prior examples. Examples 15 and 16 describe the pyrolysis of the thermosets 518 and 618, respectively, to carbon compositions 520 and 620. The thermosets 518 and 618 were heated in TGA boats from 30 to 1000° C. at 10° C./min under a nitrogen atmosphere. The iron nanoparticle carbon compositions 520 and 620 were attracted to a bar (permanent) magnet, indicating ferromagnetic behavior, Example 17.

The ferrocenyl-aryl-acetylenic compounds can have a low melting point and a broad processing window, defined as the temperature difference between the melting point and the exothermic polymerization reaction. The compounds can easily be polymerized through the acetylenic units to thermosets. They lose little weight during curing and pyrolysis to metal nanoparticle-containing thermosets and carbon under atmospheric conditions. The preparation of these materials involves disubstituted benzenes bearing two ferrocenylethynyl groups or a combination of one ferrocenylethynyl and one phenylethynyl group. This allows the amount of Fe to be varied in the materials and the melting points through the preparation of the aromatic isomers, resulting in some control in the size of the processing window.

Figure 8:
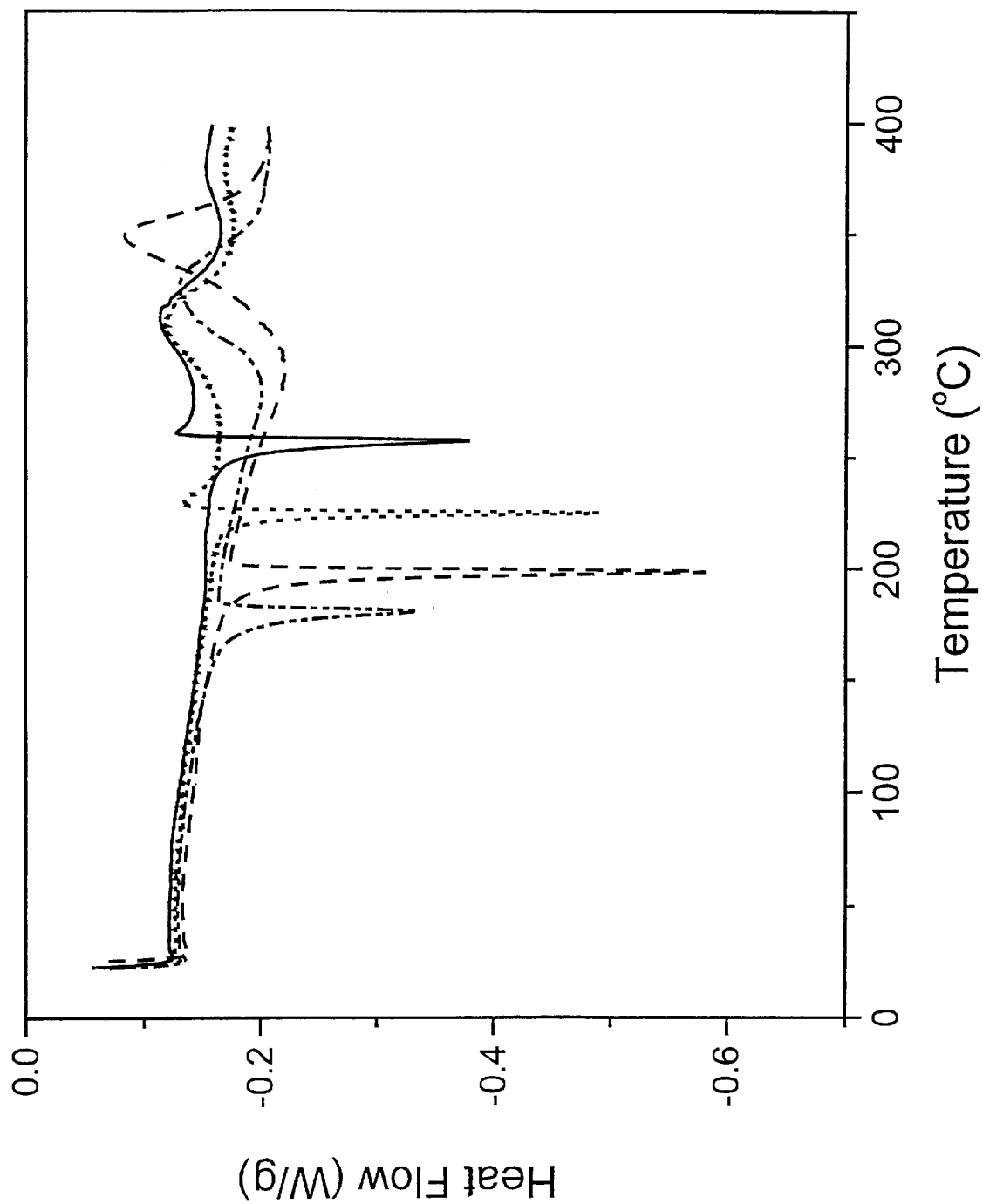
FIG. 8 is a graph of DSC Thermograms of 1,3-bis (ferrocenylethynyl)benzene (dot), 1,4-bis (ferrocenylethynyl)benzene (solid), 1-(ferrocenylethynyl)-3-(phenylethynyl)benzene (dash dot dot) and 1-(ferrocenylethynyl)-4-(phenylethynyl)benzene (dash)

Studies pertaining to the processability and decomposition of the 1,3-bis (ferrocenylethynyl) benzene, 1,4-bis (ferrocenylethynyl) benzene, 1-(ferrocenylethynyl)-3-(phenylethynyl) benzene and 1-(ferrocenylethynyl)-4-(phenylethynyl) benzene resulting in the formation of metal nanoparticles were determined using thermal analysis. To obtain a shaped structure, fiber or film, it is important that the compounds melt. The ultimate size and separation of the Fe nanoparticles will be dependent on the time to gelation at a given temperature or whether decomposition of the ferrocene moiety occurs in the melt phase or after solidification. Differential scanning calorimetry (DSC) is extremely valuable in determining the processing window of 1,3-bis (ferrocenylethynyl) benzene, 1,4-bis (ferrocenylethynyl) benzene, 1-(ferrocenylethynyl)-3-(phenylethynyl) benzene and 1-(ferrocenylethynyl)-4-(phenylethynyl) benzene. FIG. 8 shows the DSC thermograms for the compounds heated to 400° C. The melting points (endotherm) and polymerization reaction (cure, peak exotherm) to a cross-linked system involving the ethynyl moieties for 1,3-bis (ferrocenylethynyl) benzene, 1,4-bis (ferrocenylethynyl) benzene, 1-(ferrocenylethynyl)-3-(phenylethynyl) benzene and 1-(ferrocenylethynyl)-4-(phenylethynyl) benzene are 225° C., 257° C., 181° C., 198° C. and 310° C. 313° C., 325° C. and 350° C., respectively. Compound 1,4-bis (ferrocenylethynyl) benzene has a short processing window and actually commences to cure during the melt process.

Figure 9:
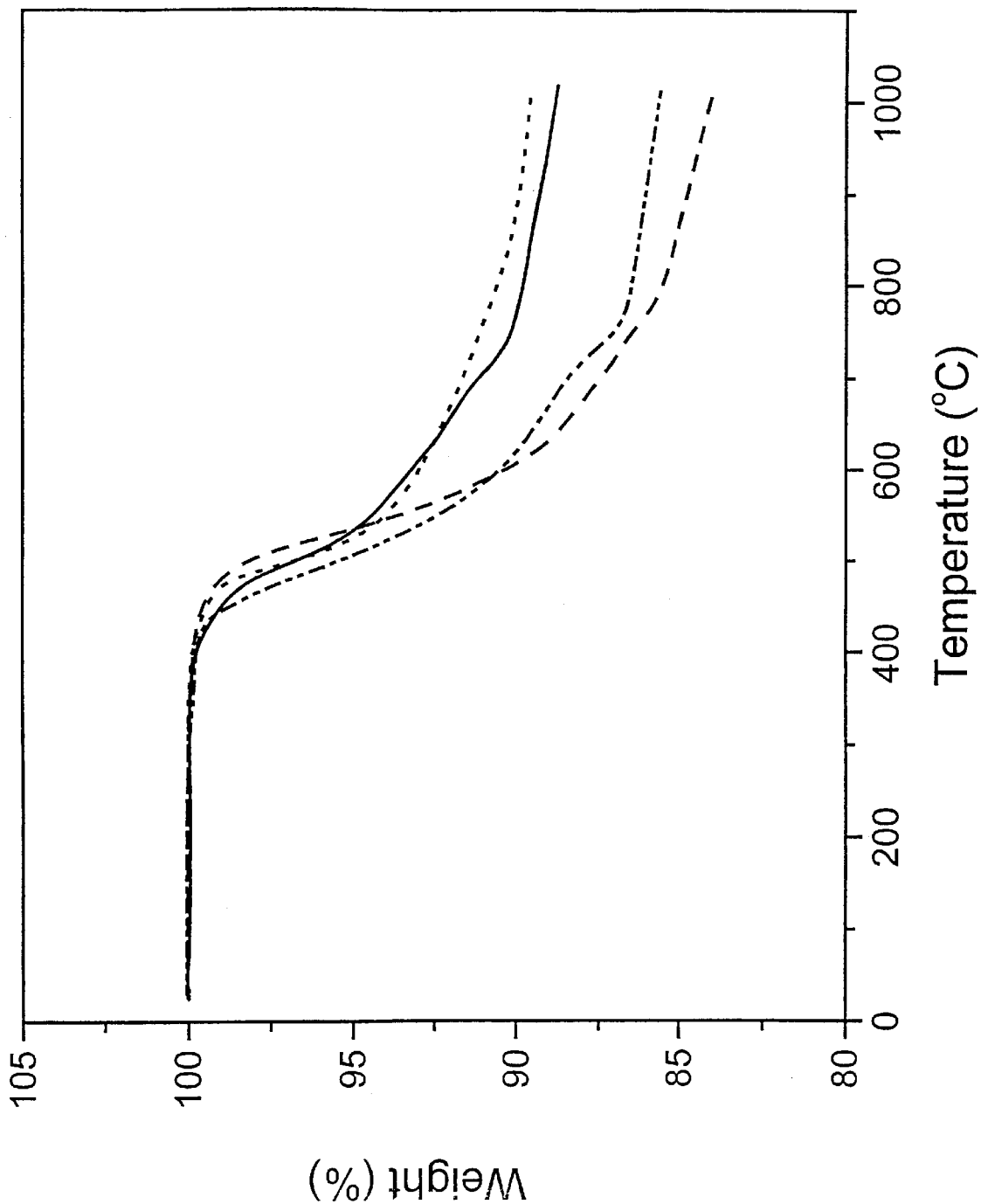
FIG. 9 is a graph of TGA Thermograms of 1,3-bis (ferrocenylethynyl)benzene (dot), 1,4-bis (ferrocenylethynyl)benzene (solid), 1-(ferrocenylethynyl)-3-(phenylethynyl)benzene (dash dot dot) and 1-(ferrocenylethynyl)-4-(phenylethynyl)benzene (dash)
Figure 10:
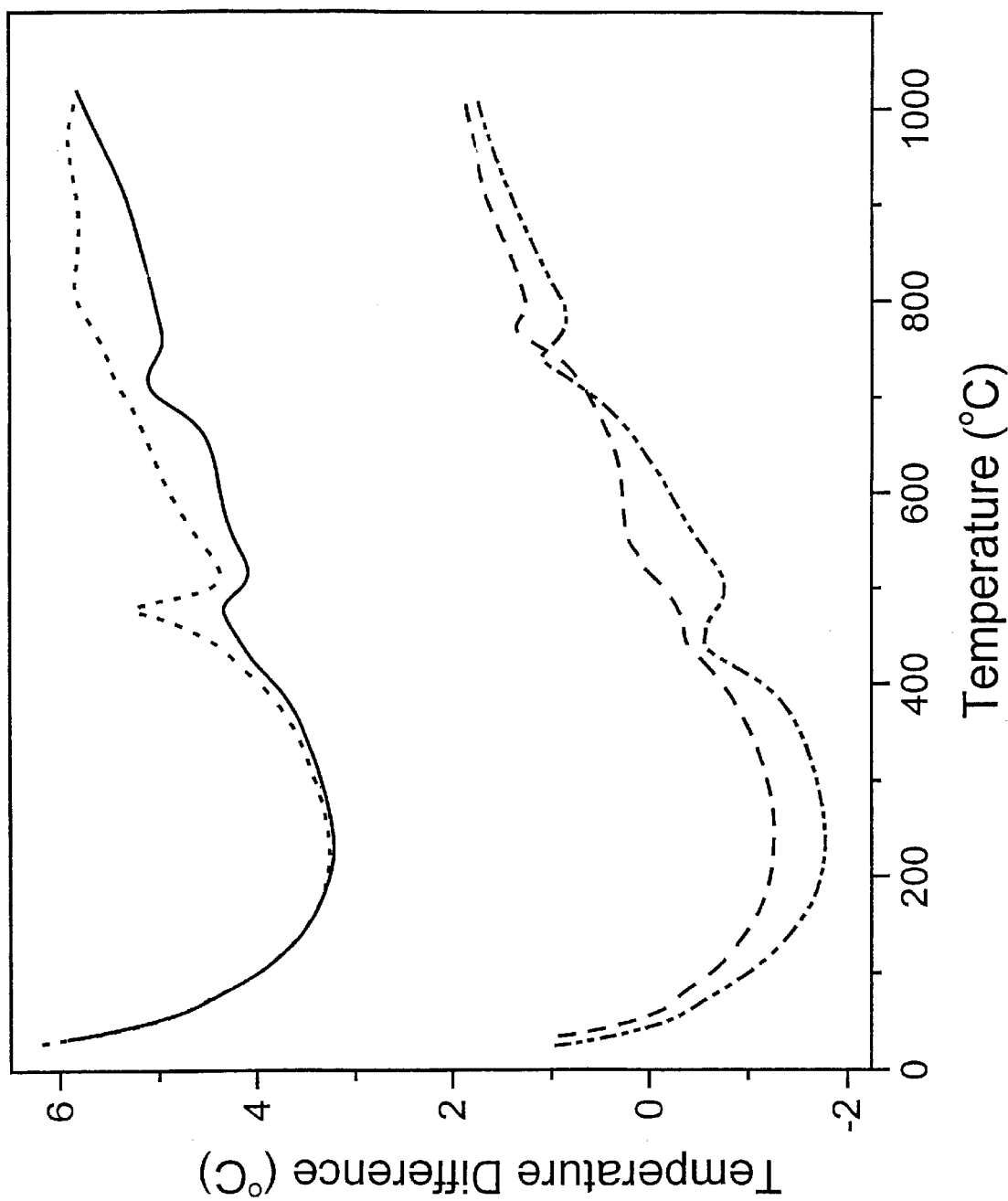
FIG. 10 is a graph of DTA Thermograms of 1,3-bis (ferrocenylethynyl)benzene (dot), 1,4-bis (ferrocenylethynyl)benzene (solid), 1-(ferrocenylethynyl)-3-(phenylethynyl)benzene (dash dot dot) and 1-(ferrocenylethynyl)-4-(phenylethynyl)benzene (dash)

The thermal stability of 1,3-bis (ferrocenylethynyl) benzene, 1,4-bis (ferrocenylethynyl) benzene, and 1-(ferrocenylethynyl)-3-(phenylethynyl) benzene, 1-(ferrocenylethynyl)-4-(phenylethynyl) benzene was determined by TGA-DTA analysis by heating each sample at 10° C./min. Under a nitrogen atmosphere up to 1000° C. (FIGS. 9 and 10). To be useful for structural applications, it is important that formation of the metal nanoparticle composition by thermal means occurs with minimum loss of weight. The thermal analysis was performed on the samples that had been converted to a polymeric matrix material (thermoset) by heating at 300 and 350° C. for 30 minutes at each temperature. Further heating of the thermosets to 1000° C. under nitrogen affords Fe nanoparticles carbon compositions in 85–90% char yield (FIG. 9). Due to the presence of the Fe nanoparticles embedded in the carbon domain, the composition is attracted to a bar (permanent) magnet, indicating ferromagnetic behavior. In some cases, the uncured samples, Examples 9 and 10, were heated directly to 1000° C.

FIG. 10 shows the differential thermal analysis (DTA) thermograms for the cured thermosets from 1,3-bis (ferrocenylethynyl) benzene, 1,4-bis (ferrocenylethynyl) benzene, and 1-(ferrocenylethynyl)-3-(phenylethynyl) benzene, 1-(ferrocenylethynyl)-4-(phenylethynyl) benzene that were heated to 1000° C. These thermograms are useful for determining endothermic and exothermic transitions occurring during thermal treatments to elevated temperatures. Thermosets 1,3-bis (ferrocenylethynyl) benzene, 1,4-bis (ferrocenylethynyl) benzene, 1-(ferrocenylethynyl)-3-(phenylethynyl) benzene, and 1-(ferrocenylethynyl)-4-(phenylethynyl) benzene displayed an exothermic transition peaking at 478, 479, 445, 441° C., which is believed due to the decomposition of the ferrocene moiety. The appearance of another exothermic transition peaking at 807, 722, 741 and 773° C. was assigned to reaction of the Fe nanoparticles with the developing carbon matrix resulting in the formation of crystalline graphite structure (magnetic structure) based on x-ray diffraction studies.

Figure 11:
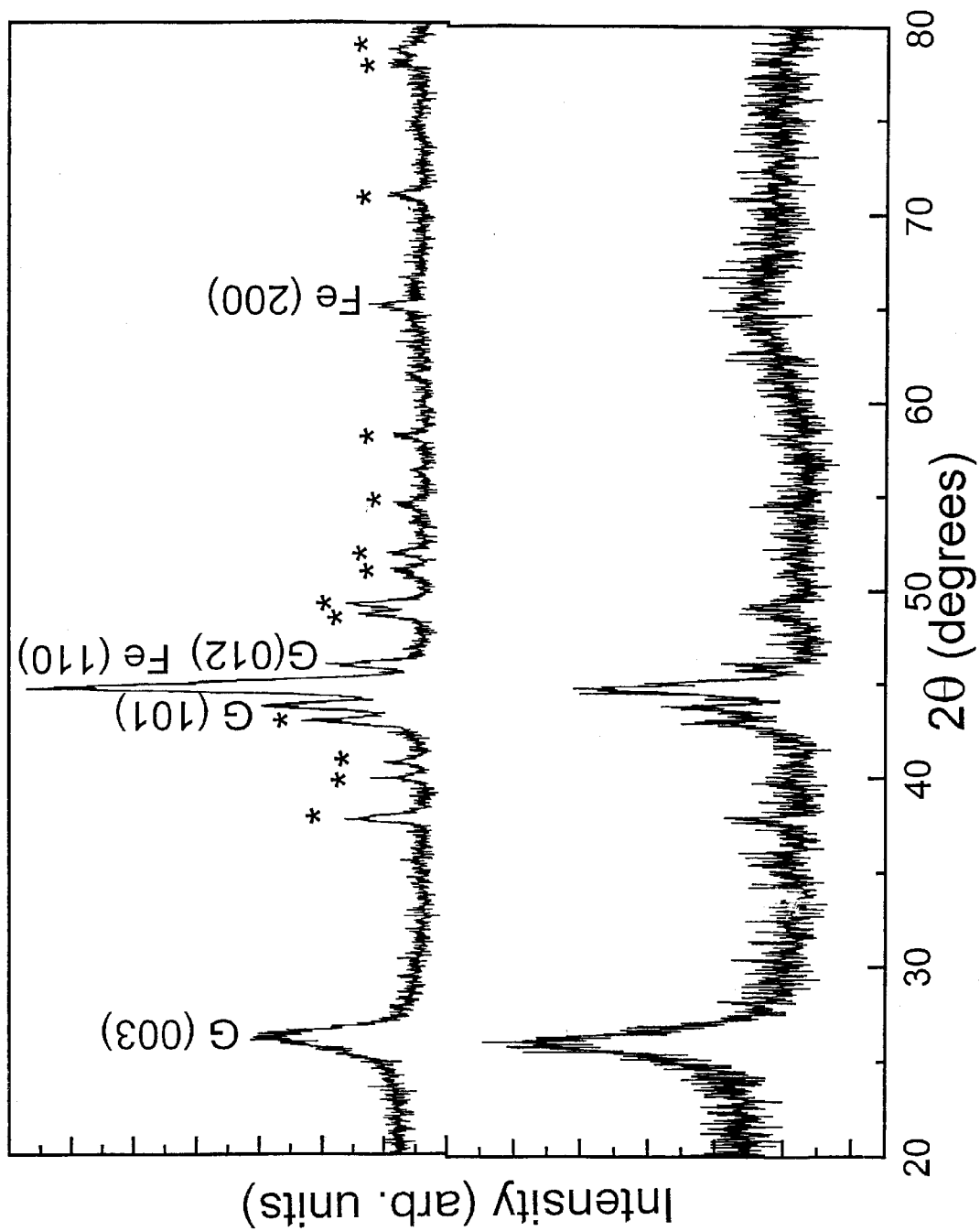
FIG. 11 is an X-Ray Diffraction of Scans for 1,3-bis (ferrocenylethynyl)benzene (top) and 1-(ferrocenylethynyl)-3-(phenylethynyl)benzene (bottom)

X-ray diffraction scans of the examples were made using CuK$\alpha$-radiation from a rotating anode x-ray source. The examples were finely ground and mounted on a Si (001) substrate. In order to avoid the silicon substrate peak, the $\omega$-angle was offset by 6°; this also gave minimum background. FIG. 11 shows the scans for samples designated as 1,3-bis (ferrocenylethynyl) benzene and 1-(ferrocenylethynyl)-4-(phenylethynyl) benzene. All the diffraction peaks have been identified and indexed based on graphite, $\alpha$-Fe and $Fe_3C$ phases. The particle sizes were estimated from the full width at half maximum (FWHM) of the diffraction peaks and the Scherrar's equation. The lattice parameters for $\alpha$-Fe and $Fe_3C$ phases were in good agreement with their corresponding bulk values. However, the lattice parameters for graphite showed a significant departure from its bulk value. The c-lattice parameter, which was calculated from the (003) peak of graphite, had a value of 10.242 Å and displayed a 2% expansion along the c-axis. This suggests that Fe atoms are substituted at the void positions situated in between the graphite layers perpendicular to the c-axis causing an expansion along this direction. There appears to be prima facie evidence that Fe is intercalated into the graphite lattice. The presence of additional $\alpha$-Fe and $Fe_3C$ phases indicate that only a certain atomic percentage of Fe is accommodated into the graphite lattice. These preliminary studies suggest that a class of materials that are magnetic semiconductors based on iron in graphite system is formed. The preliminary electrical and magnetic measurements indicated that these examples are both magnetic and electrically conducting.

The ratio of peak intensities of graphite (003) and $\alpha$-Fe (110) was very much dependent on the Fe-content in the precursor material whereas the shift in the graphite (003) was nearly independent. Samples 1,3-bis (ferrocenylethynyl) benzene and 1,4-bis (ferrocenylethynyl) benzene, which had similar Fe-content, showed identical diffraction patterns in which $\alpha$-Fe (110) peak was much stronger than the graphite (003) peak. 1-(ferrocenylethynyl)-3-(phenylethynyl) benzene and 1-(ferrocenylethynyl)-4-(phenylethynyl) benzene had a lower Fe-content and their diffraction patterns showed a much stronger graphite (003) peak in comparison with the Fe (110) peak. Furthermore, the Fe$_3$C phase was substantially reduced when compared to the bcc-Fe phase. The particle sizes and the c-lattice parameters for graphite are all listed in FIG. 12.

The homogeneous dispersion of very small metal nanoparticles into a polymeric, carbon or ceramic matrix can lead to materials with unique properties. By varying the polymeric composition, the temperature and time at a given temperature, the average particle size can be varied between 1–100 nm. The examples illustrate the reaction of ethynylferrocene with bromoiodobenzene or diiodobenzene. The method allows for the ability to control the amount of Fe incorporated into the precursor compounds. The compounds upon thermal treatment up to and above 500° C., respectively, afford Fe embedded homogeneously in the cross-linked polymer or carbon domain. The viscosity of the melt at a given temperature will control the diffusive properties of the individual metal particles in the polymerizing matrix. The size and interparticle separation of the Fe nanoparticles will be controlled in the melt state above 300° C. Upon gelation, the mobility of the Fe particles will cease and the particles will be locked in place. Thus, shaped components and films can be readily fabricated from the melt or liquid state of the precursor compounds. The matrix domain has the ability to control the size and shape of the growing metal nanoparticle and to protect it against oxidation.

Having described the invention, the following examples are given to illustrate specific applications of the invention, including the best mode now known to perform the invention. These specific examples are not intended to limit the scope of the invention described in this application.

EXAMPLES

All reactions were performed under argon using standard Schlenk line techniques. Reagent grade solvents were dried using standard methods and distilled under argon prior to use. Ethynylferrocene was prepared according the published procure in Doisneau, G. et al., J. Organomet. Chem., 425, 113 (1992), which hereby incorporated by reference. Pd(OAc)$_2$ was purchased from Strem Chemical Co. and was used as received. All other chemicals were purchased from Aldrich Chemical Co. and were used as received. Product separations were performed by column chromatography using 200–400 mesh, 60 Å silica gel. Thermogravimetric analysis (TGA) and differential scanning calorimetric analyses (DSC) were performed on a TA SDT 2960 Simultaneous DTA-TGA module and a TA DSC 2930 modulated DSC, respectively, equipped with a TA 3100 thermal analyzer. All thermal analyses were performed using heating rates of 10° C./min under a nitrogen atmosphere with flow rates of 50 cm$^3$/min. Melting points were determined by DSC analyses. Infrared spectra (FTIR) were recorded on a Nicolet Magna 750 spectrophotomer. H-NMR was performed on a Bruker AC-300 spectrometer. Elemental analyses were performed by Galbraith Laboratories, Inc. X-ray diffraction studies were performed on a Rigaku SU-200.

General Procedure for the Palladium-Catalyzed Cross-Coupling Reactions. A 50 mL round-bottomed flask equipped with a magnetic stirrer and gas inlet was purged with argon and charged with the appropriate aryl halide 102 and terminal alkyne 100, 5 mol % Pd(OAc)$_2$ and 15 mol % PPh$_3$. A 5:1:1 (v/v) tetrahydrofuran/pyridine/ diisopropylamine solvent mixture was added via syringe and the mixture was then stirred at room temperature for 20 min. CuI (1–2.5 mol %) was then added and the reaction mixture was placed in a dry ice/acetone bath (−78° C.). The mixture was then evacuated and back filled with argon several times, warmed to room temperature, and stirred for 16 h at 25° C. or 60° C. for the aryl iodide or aryl bromide, respectively, with the progress of the reaction being monitored by $^1$H-NMR. Upon completion of the reaction, the mixture was filtered through Celite, the volatiles were removed in vacuo and the product was separated by flash chromatography on silica gel.

Example 1

Synthesis of 1-(ferrocenylethynyl)-3-bromobenzene. 1-(Ferrocenylethynyl)-3-bromobenzene 204 was prepared following the general procedure found in General Procedure for the Palladium-Catalyzed Cross-Coupling Reactions using 500 mg (2.38 mmol) of ethynylferrocene 200, 642 mg (2.27 mmol) of 1-bromo-3-iodobenzene 202, 25.5 mg (0.114 mmol) Pd(OAc)$_2$, 89.2 mg (0.341 mmol) of PPh$_3$, and 10.8 mg (0.0568 mmol) of CuI in 25 mL tetrahydrofuran, 5 mL pyridine and 5 mL diisopropylamine at 25° C. The residue was purified using a 5:1 hexane/CH$_2$Cl$_2$ solvent mixture to afford 761 mg (92%) of an orange-red solid, m.p. 130° C. Spectral data for 1-(ferrocenylethynyl)-3-bromobenzene 204: IR (cm$^{-1}$, KBr): 3094 (C—H), 3057 (C—H), 2218 (C°C.), 2204 (C≡C), 1591 (C═C, benzene), 1583 (C═C, benzene), 1552 (C═C, benzene), 1411 (C═C, ferrocene). H NMR (d in CDCl$_3$): 7.63 (t, J=1.7 Hz, 1H), 7.41 (m, 2H), 7.17 (t, J=7.8 Hz, 1H), 4.50 (t, J=1.9 Hz, 2H), 4.25 (t, J=1.9 Hz, 2H), 4.24 (s, 5H). Analysis for 1-(ferrocenylethynyl)-3-bromobenzene 204 (C$_{18}$H$_{13}$FeBr) Calcd: C, 59.22%; H, 3.59%. Found: C, 59.15%; H, 3.84%.

Example 2

Synthesis of 1-(ferrocenylethynyl)-4-bromobenzene 1-(Ferrocenylethynyl)-4-bromobenzene 304 was prepared following the general procedure found in General Procedure for the Palladium-Catalyzed Cross-Coupling Reactions using 500 mg (2.38 mmol) of ethynylferrocene 300, 641 mg (2.27 mmol) of 1-bromo-4-iodobenzene 302, 25.4 mg (0.114 mmol) Pd(OAc)$_2$, 89.0 mg (0.340 mmol) of PPh$_3$, and 10.8 mg (0.0568 mmol) of CuI in 25 mL tetrahydrofuran, 5 mL pyridine and 5 mL diisopropylamine at 25° C. The residue was purified using a 3:1 hexane/CH$_2$Cl$_2$ solvent mixture to afford 703 mg (85%) of an orange-red solid, m.p. 147° C. Spectral data for 1-(ferrocenylethynyl)-4-bromobenzene 304: IR (cm$^{-1}$, KBr): 3104 (C—H), 3082 (C—H), 2218 (C°C.), 2205 (C≡C), 1496 (C═C, benzene), 1411 (C═C, ferrocene). H NMR (d in CDCl$_3$): 7.46–7.42 (m, 2H), 7.35–7.31 (m, 2H), 4.49 (t, J=1.7 Hz, 2H), 4.24 (t, J=1.7 Hz, 2H), 4,23 (s, 5H). Analysis for 1-(ferrocenylethynyl)-4-bromobenzene 304 (C$_{18}$H$_{13}$FeBr) Calcd: C, 59.22%; H, 3.59%. Found: C, 59.22%; H, 3.76%.

Example 3

Synthesis of 1-(ferrocenylethynyl)-3-(phenylethynyl) benzene 1-(Ferrocenylethynyl)-3-(phenylethynyl)benzene 208 was prepared following the general procedure found in General Procedure for the Palladium-Catalyzed Cross-Coupling Reaction using 500 mg (1.37 mmol) of 1-(ferrocenylethynyl)-3-bromobenzene 204, 210 mg (2.05 mmol) of phenylacetylene 206, 15.4 mg (0.0686 mmol) Pd(OAc)$_2$, 53.9 mg (0.206 mmol) of PPh$_3$, and 2.6 mg (0.0137 mmol) of CuI in 25 mL tetrahydrofuran, 5 mL pyridine and 5 mL diisopropylamine at 60° C. The residue was purified using a 5:1 hexane/CH$_2$Cl$_2$ solvent mixture to afford 442 mg (84%) of an orange-red solid, m.p. 181° C. Spectral data for 1-(ferrocenylethynyl)-3-(phenylethynyl) benzene 208: IR (cm$^{-1}$, KBr): 3111 (C—H), 3097 (C—H), 2212 (C≡C), 1597 (C═C, benzene), 1570 (C═C, benzene), 1491 (C═C, benzene), 1411 (C═C, ferrocene). H NMR (d in CDCl$_3$): 7.67 (m, 1H), 7.53 (m, 2H), 7.44 (m, 2H), 7.34 (m, 3H), 7.29 (t, J=7.8 Hz, 1H), 4.50 (t, J=1.8 Hz, 2H), 4.24 (m, 7H). Analysis for 1-(ferrocenylethynyl)-3-(phenylethynyl)benzene 208 (C$_{26}$H$_{18}$Fe) Calcd: C, 80.84%; H, 4.70%. Found: C, 80.31%; H, 4.63%.

Example 4

Synthesis of 1-(ferrocenylethynyl)-4-(phenylethynyl) benzene. 1-(Ferrocenylethynyl)-4-(phenylethynyl)benzene 308 was prepared following the general procedure found in General Procedure for the Palladium-Catalyzed Cross-Coupling Reaction1 for the palladium-catalyzed coupling reaction using 500 mg (1.37 mmol) of 1-(ferrocenylethynyl)-4-bromobenzene 304, 210 mg (2.05 mmol) of phenylacetylene 306, 15.4 mg (0.0686 mmol) Pd(OAc)$_2$, 53.9 mg (0.206 mmol) of PPh$_3$, and 2.6 mg (0.0137 mmol) of CuI in 25 mL tetrahydrofuran, 5 mL pyridine and 5 mL diisopropylamine at 60° C. The residue was purified using a 5:1 hexane/CH$_2$C$_{12}$ solvent mixture to afford 385 mg (73%) of an orange-red solid, m.p. 198° C. Spectral data for 1-(ferrocenylethynyl)-4-(phenylethynyl) benzene 308: IR (cm$^{-1}$, KBr): 3084 (C—H), 3056 (C—H), 2203 (C≡C), 1594 (C═C, benzene), 1517 (C═C, benzene), 1411 (C═C, ferrocene). H NMR (d in CDCl$_3$): 7.51 (m, 2H), 7.45 (m, 4H), 7.33 (m, 3H), 4.50 (t, J=1.9 Hz, 2H), 4.24 (t, J=1.9 Hz, 2H), 4.23 (s, 5H). Analysis for 1-(ferrocenylethynyl)-4-(phenylethynyl)benzene 308 (C$_{26}$H$_{18}$Fe) Calcd: C, 80.84%; H, 4.70%. Found: C, 80.06%; H, 4.72%.

General Procedure for Thermoset Formation

The organometallic-acetylene 108 compound was weighed into a TGA boat and polymerized by heating under a nitrogen atmosphere at 225° C. for 5 min, at 300° C. for 30 min, at 350° C. for 30 min and then cooled, resulting in the formation of a solid, black thermosetting polymeric material 110. All thermal analyses were performed using heating rates of 10° C./min under a nitrogen atmosphere with flow rates of 50 cm$^3$/min.

Example 5

Polymerization of 1-(ferrocenylethynyl)-3-(phenylethynyl)benzene. Compound 1-(ferrocenylethynyl)-3-(phenylethynyl)benzene 208 (15.1 mg) 38 synthesized in Example 3, was weighed into a TGA boat and polymerized by heating under a nitrogen atmosphere at 225° C. for 5 min, at 300° C. for 30 min and at 350° C. for 30 min, resulting in the formation of a solid thermosetting polymeric material 210. During the heat treatment, the sample lost about 12% of its weight. An FTIR spectrum of the polymer showed the absence of the acetylenic carbon-carbon triple bond absorption at 2212 cm$^{-1}$.

Example 6

Polymerization of 1-(ferrocenylethynyl)-4-(phenylethynyl)benzene. Compound 1-(ferrocenylethynyl)-4-(phenylethynyl)benzene (15.1 mg) 308 synthesized in Example 4 was weighed into a TGA boat and polymerized by heating under a nitrogen atmosphere at 225° C. for 5 min, at 300° C. for 30 min and at 350° C. for 30 min, resulting in the formation of a solid thermosetting polymeric material 310. During the heat treatment, the sample lost about 18% of its weight. An FTIR spectrum of the polymer showed the absence of the acetylenic carbon-carbon triple bond absorption at 2203 cm$^{-1}$.

Example 7

Carbonization of 1-(ferrocenylethynyl)-3-(phenylethynyl)benzene. The thermoset 210 from the polymerization of 1-(ferrocenylethynyl)-3-(phenylethynyl) benzene 208 (13.3 mg) using the procedure in General procedure for thermoset formation was further heated in the TGA boat from 30 to 1000° C. at 10° C./min under a nitrogen atmosphere, resulting in a char yield of 86%. The thermoset 60 lost 9% of its weight between 400 and 600° C. The remaining 5% occurred between 600 and 1000° C., resulting in carbonization and the formation of iron nanoparticles 212. The iron nanoparticle carbon composition 212 was attracted to a bar (permanent) magnet, indicating ferromagnetic behavior.

Example 8

Carbonization of 1-(ferrocenylethynyl)-4-(phenylethynyl)benzene. The resulting thermoset from the polymerization of 1-(ferrocenylethynyl)-4-(phenylethynyl) benzene (11.4 mg) 308 using the procedure in Example 6 was further heated in a TGA boat from 30 to 1000° C. at 10° C./min under a nitrogen atmosphere, resulting in a char yield of 84%. The thermoset 310 lost 10% of its weight between 400 and 600° C. The remaining 6% occurred between 600 and 1000° C., resulting in carbonization and the formation of iron nanoparticles 312. The iron nanoparticle ceramic composition 312 was attracted to a bar (permanent) magnet, indicating ferromagnetic behavior.

Example 9

Carbonization of 1-(ferrocenylethynyl)-3-(phenylethynyl)benzene by direct conversion to thermoset and iron nanoparticle carbon composition in one step. 1-(Ferrocenylethynyl)-3-(phenylethynyl)benzene 208 (15.4 mg) was weighed into a TGA boat heated under a nitrogen atmosphere at 225° C. for 60 min resulting in a weight loss of 10% due to solvent and other volatiles. Upon cooling back to room temperature, the sample was then carbonized by heating to 1000° C. at 10° C./min under a nitrogen atmosphere, resulting in a char yield of 88%. The resulting iron nanoparticle carbon composition 212 exhibited magnetic properties as determined from attraction to a bar (permanent) magnet.

Example 10

Carbonization of 1-(ferrocenylethynyl)-4-(phenylethynyl)benzene by direct conversion to thermoset and iron nanoparticle carbon composition in one step. 1-(Ferrocenylethynyl)-4-(phenylethynyl)benzene (20.4 mg) 308 was weighed into a TGA boat and heated under a nitrogen atmosphere at 225° C. for 60 min resulting in a weight loss of 12% due to solvent and other volatiles. Upon cooling back to room temperature, the sample was then carbonized by heating to 1000° C. at 10° C./min under a nitrogen atmosphere, resulting in a char yield of 85%. The resulting iron nanoparticle carbon composition 312 exhibited magnetic properties as determined from attraction to a bar (permanent) magnet.

Example 11

Synthesis of 1,3-bis(ferrocenylethynyl)benzene 1,3-Bis (ferrocenylethynyl)-benzene 516 was prepared following the general procedure found in General Procedure for the Palladium-Catalyzed Cross-Coupling Reactions for the palladium-catalyzed coupling reaction using 520 mg (2.48 mmol) of ethynylferrocene 500, 389 mg (1.18 mmol) of 1,3-diiodobenzene 502, 13.3 mg (0.059 mmol) Pd(OAc)$_2$, 46.4 mg (0.177 mmol) of PPh$_3$, and 5.6 mg (0.030 mmol) of CuI in 25 mL tetrahydrofuran, 5 mL pyridine and 5 mL diisopropylamine at 25° C. The residue was purified using a 5:1 hexane/CH$_2$Cl$_2$ solvent mixture to afford 526 mg (82%) of an orange solid, m.p. 225° C. Spectral data for 1,3-bis (ferrocenylethynyl)benzene 516: IR (cm$^{-1}$, KBr): 3103 (C—H), 3088 (C—H), 2215 (C≡C), 1594 (C═C, benzene), 1569 (C═C, benzene), 1410 (C═C, ferrocene). NMR (d in CDCl$_3$): 7.61 (t, J=1.5 Hz, 1H), 7.40 (dd, J=7.1 Hz, J=1.5 Hz, 2H), 7.26 (t, J=7.1 Hz, 1H), 4.50 (t, J=1.9 Hz, 4H), 4.24 (m, 14H). Analysis for 1,3-bis(ferrocenylethynyl) benzene 516 (C$_{30}$H$_{22}$Fe$_2$) Calcd: C, 72.91%; H, 4.49%. Found: C, 72.42%; H, 4.69%.

Example 12

Synthesis of 1,4-bis(ferrocenylethynyl)benzene. 1,4-Bis (ferrocenylethynyl)-benzene 616 was prepared following the general procedure found for the palladium-catalyzed coupling reaction using 500 mg (2.38 mmol) of ethynylferrocene 600, 314 mg (0.952 mmol) of 1,4-diiodobenzene 602, 10.7 mg (0.0476 mmol) Pd(OAc)$_2$, 37.3 mg (0.143 mmol) of PPh$_3$, and 3.6 mg (0.019 mmol) of CuI in 25 mL tetrahydrofuran, 5 mL pyridine and 5 mL diisopropylamine at 25° C. The residue was purified using a 2:1 hexane/ CH$_2$Cl$_2$ solvent mixture to afford 343 mg (73%) of an orange solid, m.p. 257° C. Spectral data for 1,4-bis (ferrocenylethynyl)benzene 616 IR (cm$^{-1}$, KBr): 3099 (C—H), 3080 (C—H), 2224 (C≡C), 2202 (C° C.), 1519 (C═C, benzene) 616, 1411 (C═C, ferrocene). H NMR (d in CDCl$_3$): 7.41 (s, 4H), 4.49 (t, J$_{H-H}$=3.3 Hz, 4H), 4.24 (m, 14H). Analysis for 1,4-bis(ferrocenylethynyl)benzene 616 (C$_{30}$H$_{22}$Fe$_2$) Calcd: C, 72.91%; H, 4.49%. Found: C, 72.46%; H, 4.61%.

Example 13

Polymerization of 1,3-bis(ferrocenylethynyl)benzene. Compound 1,3-bis(ferrocenylethynyl)benzene 516 (16.8 mg) synthesized in Example 11 was weighed into a TGA boat and polymerized by heating under a nitrogen atmosphere at 225° C. for 5 min, at 300° C. for 30 min and at 350° C. for 30 min, resulting in the formation of a solid, black thermosetting polymeric material 518. During the heat treatment, the sample lost about 11% of its weight. An FTIR spectrum of the polymer 518 showed the absence of the acetylenic carbon-carbon triple bond absorption at 2215 cm$^{-1}$.

Example 14

Polymerization of 1,4-bis(ferrocenylethynyl)benzene. Compound 1,4-bis(ferrocenylethynyl)benzene 616 (13.7 mg) synthesized in Example 12 was weighed into a TGA boat and polymerized by heating under a nitrogen atmosphere at 225° C. for 5 min, at 300° C. for 30 min and at 350° C. for 30 min, resulting in the formation of a solid, black thermosetting polymeric material 618. During the heat treatment, the sample lost about 16% of its weight. An FTIR spectrum of the polymer 618 showed the absence of the acetylenic carbon-carbon triple bond absorptions at 2224 and 2202 cm$^{-1}$.

Example 15

Carbonization of 1,3-bis(ferrocenylethynyl)benzene. The resulting thermoset 518 from the polymerization of 1,3-bis (ferrocenylethynyl)benzene 516 (15.0 mg) using the procedure in General procedure for thermoset formation was further heated in a TGA boat from 30 to 1000° C. at 10° C./min under a nitrogen atmosphere, resulting in a char yield of 90%. The thermoset 518 lost 7% of its weight between 400 and 600° C. The remaining 3% occurred between 600 and 1000° C., resulting in carbonization and the formation of iron nanoparticles in the carbon composition 520. The iron nanoparticle carbon composition 520 was attracted to a bar (permanent) magnet, indicating ferromagnetic behavior.

Example 16

Carbonization of 1,4-bis(ferrocenylethynyl)benzene. The resulting thermoset 618 from the polymerization of 1,4-bis (ferrocenylethynyl)benzene 616 (11.6 mg) using the procedure in General procedure for thermoset formation was further heated in a TGA boat from 30 to 1000° C. at 10° C./min under a nitrogen atmosphere, resulting in a char yield of 88%. The thermoset 618 lost 7% of its weight between 350 and 600° C. The remaining 5% occurred between 600 and 1000° C., resulting in carbonization and the formation of iron nanoparticles 620. The iron nanoparticle carbon composition 620 was attracted to a bar (permanent) magnet, indicating ferromagnetic behavior.

Example 17

Thermosets with magnetic properties. When thermoset polymers as cured in Examples 13 and 14 were further heated at 400 to 500° C. for various lengths of time, the samples showed magnetic properties as determined by their attraction to a bar (permanent) magnet. These observations indicate that the ferrocene moiety decomposes or degrades resulting in the deposition of iron nanoparticles in the various thermosetting compositions.

Example 18

Polymerization of 1,4-bis(ferrocenyl) butadiyne. 1,4-Bis (ferrocenyl)butadiyne (14.1 mg) was placed in a TGA/DTA chamber and heated under a nitrogen atmosphere at 10° C./min to 1000° C. The sample melted at about 203° C. followed by the immediate conversion to a thermoset as determined from an exotherm peaking at 259° C. Between 350 and 500° C., the sample lost about 30% weight attributed to volatilization and the formation of a iron nanoparticle composition. Further heating above 500° C. resulted in carbonization and the homogeneous formation of an iron nanoparticle carbon composition. At 1000° C., the sample retained 64% of the original weight and was magnetic as determined from the attraction to a bar (permanent) magnet.

Example 19

Formation of fibers from 1-(ferrocenylethynyl)-3-(phenylethynyl)benzene. Compound 1-(ferrocenylethynyl)-3-(phenylethynyl)benzene 208 (0.5 g) was weighed into an aluminum planchet and heated at 275–300° C. resulting in an increase in viscosity. Before gelation or solidification occurred, a glass rod was pushed into the thick composition and removed resulting in the formation of a fibrous glassy material These results indicate that fibers could be formed from the viscous material, thermally cured to a shaped fiber, and further heat treated at elevated temperature resulting in the formation of fibrous polymer and carbon materials with magnetic properties.

In the examples ferrocenylethynyl compounds were used as the precursors to Fe nanoparticle polymeric and carbon compositions. TGA/DTA studies show an exothermic transition for the compounds peaking between 722 and 807° C., which is believed due to the reaction of the Fe particle with the developing carbon matrix. A shift in the c-lattice parameter for graphite suggests the intercalation of Fe nanoparticles between the graphite layers and the formation of magnetic semiconductors. Upon gelation, the polymeric and carbon domains should prevent the agglomeration of Fe nanoparticles, passivate the particle against oxidation, and define the minimum interparticle distance.

Obviously, many modifications and variations of the present invention are possible in light of the above teachings. It is therefore to be understood that, within the scope of the appended claims, the invention may be practiced otherwise than as specifically described.

What is claimed is:

1. A chemical composition comprising the formula:

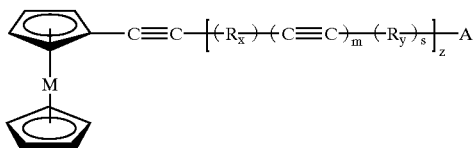

wherein when z is 0, then A is selected from the group consisting of metallocenylethynyl, and phenylethynyl;

wherein when z is 1, s is 0, and m is 1, then A is selected from the group consisting of metallocenylethynyl and phenylethynyl;

wherein when z is 1, s is 1, and m is 1, then A is selected from the group consisting of H and phenylethynyl;

wherein when z is 2, s is 0 in the repeating unit adjacent to A, and m is 0 in the repeating unit adjacent to A, then A is selected from the group consisting of H and phenylethynyl;

wherein when z is 2, s is 0 in the repeating unit adjacent to A and m is 1 in the repeating unit adjacent to A, then A is selected from the group consisting of metallocenylethynyl and phenylethynyl;

wherein when z is 3, s is 0 in the repeating unit adjacent to A, and m is 1 in the repeating unit adjacent to A, then A is selected from the group consisting of metallocenylethynyl and phenylethynyl;

wherein in all other cases A is selected from the group consisting of H, metallocenylethynyl, and phenylethynyl;

wherein M is a metal selected independently from the group consisting of Fe, Mn, Ru, Co, Ni, Cr and V;

wherein $R_x$ is independently selected from the group consisting of an aromatic, a substituted aromatic group and combinations thereof;

wherein $R_y$ is independently selected from the group consisting of an aromatic, a substituted aromatic group and combinations thereof;

wherein m is $\geq 0$;

wherein s is $\geq 0$;

wherein z is $\geq 0$; and wherein m and s are independently determined in each repeating unit.

2. The chemical composition of claim 1,
wherein $R_x$ is selected from the group consisting of 1,3-phenyl and 1,4-phenyl;
wherein M is Fe;

wherein m is 0;
wherein s is 0;
wherein z is 1; and
wherein A is phenylethynyl.

3. The chemical composition of claim 1,
wherein $R_x$ and $R_y$ are independently selected from the group consisting of 1,3-phenyl and 1,4-phenyl;
wherein M is Fe;
wherein m $\geq 1$;
wherein s is 1 in the repeating unit adjacent to A and s is 0 in each other repeating unit;
wherein z is >1; and
wherein A is selected from the group consisting of H, metallocenylethynyl, and phenylethynyl.

4. The chemical composition of claim 1,
wherein $R_x$ is selected from the group consisting of 1,3-phenyl and 1,4-phenyl;
wherein M is Fe;
wherein m is 0;
wherein s is 0;
wherein z is 1; and
wherein A is selected from the group consisting of metallocenylethynyl and phenylethynyl.

5. A method of forming a monomer, the method comprising the following steps:
forming a 1-(metallocenylethynyl)-3 or 4-halobenzene;
reacting said 1-(metallocenylethynyl)-3 or 4-halobenzene with a phenylacetylene;
and forming a 1-(metallocenylethynyl)-3- or 4-(phenylethynyl)benzene.

6. A method of forming a monomer, the method comprising the following steps:
forming a 1-(metallocenylethynyl)-3 or 4-halobenzene;
reacting said 1-(metallocenylethynyl)-3 or 4-halobenzene with an ethynylmetallocene; and
forming a 1,3-bis(metallocenylethynyl)benzene or 1,4-bis(metallocenylethynyl)benzene.

7. A method of forming a polymeric monomer comprising the steps of:
forming a 1-(metallocenylethynyl)-3 or 4-halobenzene;
reacting said 1-(metallocenylethynyl)-3 or 4-halobenzene with (trimethylsilanyl)acetylene to form 1-(metallocenylethynyl)-3 or 4-ethynylbenzene;
reacting 1-(metallocenylethynyl)-3 or 4-ethynylbenzene with a di-substituted aromatic halide to form 1-(metallocenylethynyl)-3 or 4-(phenylethynyl)3- or 4-phenyl halide;
reacting said 1-(metallocenylethynyl)-3 or 4-(phenylethynyl)3- or 4-phenyl halide with (trimethylsilanyl)acetylene to form metallocenyl-poly (3- or 4-ethynylphenyl)-acetylene;
repeating the prior two steps, zero or more times, by reacting with di-substituted aromatic halide followed by (trimethylsilanyl)acetylene to increase the length of said monomer;
forming a metallocenyl-poly(3- or 4-ethynylphenyl) monomer comprising the following formula by reacting the metallocenyl-poly(3 or 4-ethynylphenyl)-acetylene with 1-halo-3 or 4-substituted benzene:

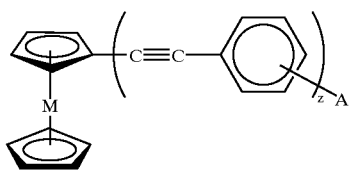

wherein A is selected from the group consisting of H, metallocenylethynyl and phenylethynyl; and
  wherein M is a metal selected independently from the group consisting of Fe, Mn, Ru, Co, Ni, Cr and V; and
  wherein z is $\geq 1$.

8. The chemical composition of claim 1,
  wherein when z is from 1 to 3 and A is H, s $\geq 1$ in the repeating unit adjacent to A.

9. The chemical composition of claim 1,
  wherein s $\geq 1$ in the repeating unit adjacent to A.

10. The chemical composition of claim 1,
  wherein s is 1 in the repeating unit adjacent to A.

11. The chemical composition of claim 1,
  wherein when z is 0, A is phenylethynyl.

12. The chemical composition of claim 1,
  wherein A is selected from the group consisting of metallocenylethynyl, and phenylethynyl.

13. The chemical composition of claim 1,
  wherein A is phenylethynyl.

14. The chemical composition of claim 1,
  wherein A is metallocenylethynyl.

* * * * *

UNITED STATES PATENT AND TRADEMARK OFFICE
CERTIFICATE OF CORRECTION

PATENT NO. : 6,673,953 B2
APPLICATION NO. : 10/006226
DATED : January 6, 2004
INVENTOR(S) : Teddy M. Keller et al.

It is certified that error appears in the above-identified patent and that said Letters Patent is hereby corrected as shown below:

On the Title Page
Item (75) Delete Inventor Syed B. Qadri

Signed and Sealed this

Fifth Day of August, 2008

JON W. DUDAS
*Director of the United States Patent and Trademark Office*